United States Patent
Kells et al.

(10) Patent No.: US 11,912,634 B2
(45) Date of Patent: *Feb. 27, 2024

(54) CALCIUM SULFATE UREA GRANULES AND METHODS FOR PRODUCING AND USING THE SAME

(71) Applicant: SABIC Global Technologies B.V., Bergen op Zoom (NL)

(72) Inventors: Andrew George Kells, Wilton (GB); Mohamed Akasha M. Khaleel, Riyadh (SA)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/741,638

(22) Filed: May 11, 2022

(65) Prior Publication Data
US 2022/0267230 A1  Aug. 25, 2022

Related U.S. Application Data

(63) Continuation of application No. 16/631,278, filed as application No. PCT/IB2018/055399 on Jul. 19, 2018, now Pat. No. 11,352,306.
(Continued)

(30) Foreign Application Priority Data

Jul. 21, 2017 (IN) .............. 201711026033

(51) Int. Cl.
*C05G 5/12* (2020.01)
*C05G 5/30* (2020.01)
(Continued)

(52) U.S. Cl.
CPC ............... *C05G 5/12* (2020.02); *C05C 9/005* (2013.01); *C05D 3/00* (2013.01); *C05G 5/30* (2020.02); *C05G 5/36* (2020.02)

(58) Field of Classification Search
None
See application file for complete search history.

(56) References Cited

U.S. PATENT DOCUMENTS

| | | |
|---|---|---|
| 2,074,880 A | 3/1937 | Whittaker et al. |
| 2,157,541 A | 5/1939 | Hosokawa |

(Continued)

FOREIGN PATENT DOCUMENTS

| | | |
|---|---|---|
| AU | 200118807 | 6/2001 |
| AU | 2012250293 | 12/2012 |

(Continued)

OTHER PUBLICATIONS

Office Action issued in Corresponding Chinese Application No. 202080061008.2, dated Aug. 18, 2022 (English Translation provided).
(Continued)

*Primary Examiner* — Wayne A Langel
(74) *Attorney, Agent, or Firm* — Norton Rose Fulbright US LLP

(57) ABSTRACT

A calcium sulfate urea (UCS) fertilizer granule and methods for making and using the same are disclosed. The granule can include urea, calcium sulfate, and a calcium sulfate urea adduct. The granule can contain 33 wt. % to 40 wt. % elemental nitrogen, 2 wt. % to 5 wt. % elemental calcium, and 2 wt. % to 5 wt. % elemental sulfur.

20 Claims, 3 Drawing Sheets

Related U.S. Application Data

(60) Provisional application No. 62/626,932, filed on Feb. 6, 2018.

(51) Int. Cl.
   *C05C 9/00* (2006.01)
   *C05D 3/00* (2006.01)

(56) References Cited

U.S. PATENT DOCUMENTS

| | | |
|---|---|---|
| 3,419,379 A | 12/1968 | Goodale et al. |
| 3,925,053 A | 12/1975 | Kealy |
| 3,976,467 A | 8/1976 | Seferian et al. |
| 4,019,889 A | 4/1977 | Kealy |
| 4,283,423 A | 8/1981 | Watkins et al. |
| 4,478,632 A | 10/1984 | Van Hijfte et al. |
| 4,507,139 A | 3/1985 | Sullivan et al. |
| 5,264,017 A | 11/1993 | Van de Walle |
| 5,409,516 A | 4/1995 | Achard et al. |
| 5,716,591 A | 2/1998 | Crispoldi |
| 5,917,110 A | 6/1999 | Kust |
| 11,352,306 B2 * | 6/2022 | Kells .................. C05G 5/30 |
| 2004/0031303 A1 | 2/2004 | Whitehurst et al. |
| 2005/0144997 A1 | 7/2005 | Phillips et al. |
| 2016/0075607 A1 | 3/2016 | Aqel et al. |
| 2018/0297903 A1 | 10/2018 | Ledoux et al. |
| 2020/0148607 A1 | 5/2020 | Kiiski et al. |

FOREIGN PATENT DOCUMENTS

| | | |
|---|---|---|
| CN | 1063095 | 7/1992 |
| CN | 1463955 | 12/2003 |
| CN | 101041603 | 9/2007 |
| CN | 1894172 | 10/2007 |
| CN | 101519324 | 9/2009 |
| CN | 101798240 | 8/2010 |
| CN | 102167650 | 8/2011 |
| CN | 103086781 | 5/2013 |
| CN | 103819271 | 5/2014 |
| CN | 103086810 | 5/2015 |
| CN | 104768901 | 7/2015 |
| CN | 104803736 | 7/2015 |
| CN | 108349827 | 7/2018 |
| CN | 108530175 | 9/2018 |
| DE | 3816570 | 11/1989 |
| DE | 29809124 | 9/1999 |
| EP | 0988105 | 3/2000 |
| EP | 2774907 | 9/2014 |
| EP | 3210959 | 8/2017 |
| EP | 3372576 | 9/2018 |
| EP | 3374332 | 9/2018 |
| EP | 3419953 | 1/2019 |
| EP | 3436416 | 2/2019 |
| EP | 3571174 | 11/2019 |
| FR | 2676730 | 11/1992 |
| FR | 2684372 | 6/1993 |
| FR | 2745564 | 9/1997 |
| GB | 492387 | 9/1938 |
| GB | 624642 | 6/1949 |
| GB | 822939 | 11/1959 |
| GB | 921247 | 3/1963 |
| GB | 1189398 | 4/1970 |
| GB | 1211537 | 11/1970 |
| GB | 159854 | 12/2021 |
| IL | 133429 | 12/1999 |
| KR | 2003062520 | 7/2003 |
| PL | 206964 | 10/2010 |
| RO | 111183 | 7/1996 |
| SU | 1063800 | 12/1983 |
| WO | WO 1998/055213 | 12/1998 |
| WO | WO 2000/000452 | 1/2000 |
| WO | WO 2001/021556 | 3/2001 |
| WO | WO 2001/042172 | 6/2001 |
| WO | WO 2004/000759 | 12/2003 |
| WO | WO 2017/081183 | 5/2017 |
| WO | WO 2018/162533 | 9/2018 |
| WO | WO 2019/016761 | 1/2019 |
| WO | WO 2019/016763 | 1/2019 |
| WO | WO 2019/215271 | 11/2019 |
| WO | WO 2020/104916 | 5/2020 |
| WO | WO 2020/115698 | 6/2020 |

OTHER PUBLICATIONS

Office Action issued in Corresponding Brazilian Application No. BR1120200010686, dated May 18, 2022 (No English Translation provided).

Achard, et al., "A new route for urea-superphosphate fertilizers," *Phosphorus and Potassium*, 1994, 191:27-33.

Akhavan-Kharazian et al., "Effects of CaSO4, CaCl2, and NaCl on leaf nitrogen, nodule weight, and acetylene reduction activity in *Phaseolus vulgaris* L.," *Arid Soil Research and. Rehabilitation.*, 1991, 5(2):97-103.

Aldrich et al., "Gypsum and other sulfur materials for soil conditioning," *California Agricultural Experiment Station Publications*, 1951, Circular No. 403.

Alva et al., "Role of calcium in amelioration of copper phytotoxicity for citrus," *Soil Science*, 1993, 155:211-218.

Bayrakli "Ammonia volatilization losses from different fertilizers and effect of several urease inhibitors, CaCl2 and phosphogypsum on losses from urea," *Fertilizer Research*, 1990, 23(3):147-150.

Biskupski et al., "Influence of different level of nitrogen fertilization on yielding and selected indices of canopy architecture in several spring wheat cultivars" Pamietnik Pulawski 2006, 142, 31-41 (Abstract only).

Borowik et al., "Production technology of nitrogen-sulphur-calcium fertilizers on the base of urea and phosphogypsum," *CHEMIK*, 2012, 66(5):525-534.

Burt et al. "Flue-gas desulfurization gypsum effects on urea-degrading bacteria and ammonia volatilization from broiler litter." *Poultry Science*, 2017, 96(8):2676-2683.

De Villiers, et al. "Crystal structure of calcium sulfate-urea complex," *Journal of Crystal and Molecular Structure*, 1975; 5(4):215-226.

Dhiman, "Lecture 20 Single Superphosphate," Department of Chemical EngineeringIIT Roorkee, 2012, https://nptel.ac.in/courses/103/107/103107086/.

Epstein, "The essential role of calcium in selective cation transport by plant cells," *Plant Physiology*, 1961, 36(4):437-444.

Evangelou et al., "Mechanisms of 'basic metals'—ammonia interactions: Field implications," *Agronomy Abstracts*, 1999, 199.

Fenn et al., "Calcium stimulation of ammonium absorption in onion," *Agronomy Journal*, 1991, 83:840-843.

Fenn et al., "Influence of plant age on calcium stimulated ammonium absorption by radish and onion." *Journal of Plant Nutrition*, 1993, 16(7):1161-1177.

Firsova, "Strength of Granules Based on Calcium Sulfate Crystal Solvates," *Moscow University Chemistry Bulletin*, 2010, 65(4):274-278.

Frazier, et al., "Urea-Monocalcium Phosphate, a Component of Mixed Fertilizers," *Journal of Agriculture and Food Chemistry*, 1967, 15(2):345-347.

Hakeem, et al., "Reactive Nitrogen Inflows and Nitrogen use Efficiency in Agriculture: An Environment Perspective," *Environmental Adaptions and Stress Tolerance of Plants in the Era of Climate Change*, 2012, 10:217-232.

International Search Report and Written Opinion for Application No. PCT/IB2020/056346, dated Oct. 2, 2020, 13 pages.

International Search Report and Written Opinion for Application No. PCT/IB2020/058018, dated Nov. 18, 2020.

International Search Report and Written Opinion issued in Corresponding PCT Application No. PCT/IB2021/055807, dated Oct. 28, 2021.

International Search Report and Written Opinion issued in Corresponding PCT Application No. PCT/IB2021/055818, dated Oct. 18, 2021.

(56) References Cited

OTHER PUBLICATIONS

International Search Report and Written Opinion issued in International Patent Application No. PCT/IB2018/055397, dated Oct. 9, 2018.
International Search Report and Written Opinion issued in International Patent Application No. PCT/IB2018/055399, dated Oct. 12, 2018.
Jones, "Ammonia Volatilization: Process, Amounts, and Effects on Yield and Protein" *Montana State University College of Agriculture & Montana Agricultural Experiment Station*, Created for the Web, 2017.
Jones, et al., "Critical Ca Levels and Ca/Mg rations in *Trifolium subterraneum* L. grown on serpentine soft-.," *Agron. J.*, 1976, 68:756-759.
Khan et al., "Comparative effects of urea plus gypsum and urea plus ammonium sulphate on growth, yield and nutrition in canola cropping system in calcarosol of south-eastern Australia," *Proceedings of the 5th Joint Australian and New Zealand Soil Science Conference: Soil solutions for diverse landscapes*, 2012, 480.
Kirkby, "Maximizing calcium uptake by plants," *Communications in Soil Science and Plant Analysis*, 1979, 10(1-2):89-113.
Kotula, et al., "Czteromocznikan siarczanu wapnia—nawóz azotowo-siarkowo-wapniowy jako alter-natywa utylizacji fosfogipsu," *Prace Naukowe Politechniki Szczecinskiej*, 1998, 547, 91-96. (English Abstract Only).
Malinowski et al., "Preparation methods of calcium sulphate and urea adduct," *Polish Journal of Chemical Technology*, 2007, 9(4):111-114.
Malinowski P., et al.: "Utilization of waste gypsum in fertilizer production." Polish Journal of Chemical Technology, 16, 1, 45-47, 10. (2014).
Muneer, et al., "The role of calcium-organic interactions in soil aggregate stability .III . . . Mechanisms and models," *Australian Journal of Soil Research.*, 1989, 27:411-423.
Oenema et al., "Ammonia volatilization from compound nitrogen-sulfur fertilizers." *Optimization of Plant Nutrients*, 1993:341-349.
Office Action and Search Report issued in Corresponding Chinese Application No. 201980086833.5, dated Jan. 11, 2022 (English Translation provided).
Office Action issued in Corresponding Chinese Application No. 201880058201.3, dated Aug. 27, 2021 (English Translation provided).
Paroisse, "A new route for urea superphosphate fertilizers," *Phosphorous and Potassium*, 1994, 191, 27.
Podleśna, "Yielding Effect of Nitrogen and Sulfur At Pot Experiment Conditions With Winter Wheat," *Ecological Chemistry and Engineering A*, 2011, 18(3):401-405.
Prochnow et al., "Controlling ammonia losses during manure composting with the addition of phosphogypsum and simple superphosphate." *Sci. agric.* (*Piracicaba*, Brazil), 1995; 52(2):346-349.
Ridzwan et al., "Comparative performance of different urea coating materials for slow release" *Particuology*, 2014, 17:165-172.
Scott, et al., "Application of calcium to soil and cultivar affect elemental concentration of watermelon leaf and rind tissue," *Journal of the American Society for Horticultural Science*, 1993, 118(2):201-206.
Shainberg, et al., "Use of gypsum on soils: A review," *Advances in Soil Science*, 1989, 9:1.
Sharma et al. "Ammonia Volatilization as Influenced by Amendments in a Light Textured Alkali Soil" *Annals of Arid Zone* 33, 1991; 3:203-207.
Smyth, et al., "Aluminum and calcium constraints to continuous crop production in a Brazilian Amazon Oxisol.," *Agronomy Journal*, 1992, 84:843-850.
Vashishtha, et al., "Improvement in properties of urea by phosphogypsum coating," *International Journal of Chem Tech Research*, 2010, 2(1):36-44.
Whittaker, et al., "Reaction between Urea and Gypsum," *Industrial and Engineering Chemistry*, 1933, 25(11):1280-1282.
Zia et al., "Ammonia volatilization from nitrogen fertilizers with and without gypsum." Soil Use and Management, 1999, 15: 133-135.
Jing'an et al., *Production Process Technology*. 1st ed., Chemical Industry Press, 2000 (English Translation of relevant parts provided).
Office Action and Search Report issued in Corresponding Chinese Application No. 2020800785091, dated Oct. 21, 2022 (English translation provided).
Yunfeng et al., *New Food Processing Technology and Application*. 1st ed., China Atomic Energy Press, 2018 (English Translation of relevant parts provided).
Hearing Notice issued in corresponding Indian Application No. 202017005165, dated Mar. 7, 2023.

\* cited by examiner

CALCIUM SULFATE UREA GRANULES AND METHODS FOR PRODUCING AND USING THE SAME

CROSS REFERENCE TO RELATED APPLICATIONS

This application is a continuation application of U.S. application Ser. No. 16/631,278, filed Jan. 15, 2020, which is a national phase application under 35 U.S.C. § 371 of International Application No. PCT/IB2018/055399, filed Jul. 19, 2018, which claims the benefit and priority of India Patent Application No. 201711026033 filed Jul. 21, 2017 and U.S. Provisional Patent Application No. 62/626,932 filed Feb. 6, 2018, the entire contents of which applications are hereby incorporated by reference in their entirety.

BACKGROUND OF THE INVENTION

A. Field of the Invention

The invention generally concerns a calcium sulfate urea fertilizer granule that includes one or more calcium sulfate urea adducts. The granule can contain 33 wt. % to 40 wt. % elemental nitrogen, 2 wt. % to 5 wt. % elemental calcium, and 2 wt. % to 5 wt. % elemental sulfur.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients. Single-nutrient fertilizers and multi-nutrient fertilizers, such as fertilizer blends, have been developed to meet the varied needs of crop production worldwide.

Fertilizers containing nitrogen are used to support healthy plant growth and photosynthesis. Urea ($CH_4N_2O$) is a compound that contains nitrogen and is widely used as a nitrogen source in fertilizers. However, due to its rapid hydrolysis and nitrification in the soil, nitrogen from urea can be quickly lost. Also, using urea in fertilizer blends that contain other soil nutrients is difficult, as urea undesirably reacts with compounds such as hydrates of calcium phosphate and sulfate and organic fertilizers. These reactions can produce water that liquefies solid granules or dry mixture products, causes clumping and loss of product, and increases the rate at which these undesirable reactions take place. See Biskupski el al. (EP 2,774,907); see also Achard et al. (U.S. Pat. No. 5,409,516). Further, the production of water increases the amount of water that has to be removed during production of urea containing fertilizers making these blended fertilizers difficult and more expensive to make. See Schwob (FR 2,684,372).

Some of the problems with using urea in fertilizers have been reduced or overcome by binding urea to calcium sulfate as a calcium sulfate urea adduct. In the past, the aim of production of urea adducts for use in fertilizers, such as UCS adducts, has been to bind as much free urea in the adduct as possible. Therefore, production schemes for UCS adducts have in the past avoided using urea in stoichiometric excesses amounts, so that free urea in the product can be minimized or avoided. By way of example, Biskupski et al. discloses the use of a calcium sulfate urea adduct, $CaSO_4.4CO(NH_2)_2$, and production thereof in a continuous process by reacting a urea-sulfuric acid solution with phosphate rock. This publication focuses on the use of stoichiometric amounts or less of urea to produce the calcium sulfate urea adduct, to apparently avoid having free urea present during processing and in the products. Further, a substantial amount of water (16-25 wt. %) is used in the reaction to ensure that the produced adduct pulp can be efficiently transported (e.g., pumped) from the reaction chamber to a drying chamber. Biskupski et al. also discloses that increased water content in the reaction chamber is desirable to obtain complete reaction turnover, to produce a pulp that is suitable for granulation, and to avoid the requirement for aging or cold recycling. The amount of water used in Biskupski et al.'s process can be problematic from a manufacturing perspective, as the costs and difficulties of removing such water during final processing can be rather high and can lead to inefficiencies.

As another example, Achard et al. discloses the production of calcium sulfate urea adduct in producing phosphonitrogenous products by reacting a sulfo-urea reagent with calcium phosphate. Achard et al. teaches that the formation of calcium sulfate urea adduct is useful to keep free urea from remaining in the product and reducing the difficulties in drying products that contain urea. However, these benefits were only seen when urea and calcium sulfate were reacted in stoichiometric proportions for production of $CaSO_4.4CO(NH_2)_2$. Notably, it has been suggested in Biskupski et al. that the reaction in Achard et al. creates significant quantities of unwanted sulfur amido compounds in the product (more than 1%).

Thus, use of stoichiometric amounts or less of urea to calcium sulfate in producing a calcium sulfate urea adduct is taught to reduce or eliminate problematic free urea in fertilizer products. However, the calcium sulfate urea adduct produced by the above methods can only contain a maximum of 27 wt. % elemental nitrogen, substantially lower than what is provided by urea alone (46 wt. %). Further, as disclosed above, large amounts of water are needed to produce the adduct using a slurry based process. Also, undesired side products can be formed using the production methods known.

Others have attempted to produce a calcium sulfate urea adduct using urea in stoichiometric excess. However, the amount of nitrogen and/or sulfur in their final products is still low and/or the moisture content is high. By way of example, in the Polish Patent 206,964, using six moles of urea for each mole of calcium sulfate only produced a product with 32.7% of nitrogen and 6.3% of sulfur (see Example 3). Whittaker et al. (Industrial and Engineering Chemistry, 1933; 25(11):1280-1282) reports the adduct products therein contained less than four ureas per calcium sulfate and less than 33 wt. % nitrogen (see Tables II and III). Further, Romanian Patent 111183 discloses in Example 2 a fertilizer that has 28% nitrogen, 6.4% calcium, 5.2% sulfur, and 11% water. Example 3 of the Romanian Patent discloses a fertilizer that has 34% nitrogen, 4.1% calcium, and 3.2% sulfur, but the product contained a high amount of water (6.5%). These high amounts of water can cause liquefaction of solid or dry fertilizers, clumping and loss of product, and increases in the rate at which undesirable reactions take place, such as reactions with free urea. Accordingly, there is still a need for stable nitrogen fertilizers that that can be made efficiently on a commercial scale.

SUMMARY OF THE INVENTION

A discovery has been made that addresses at least some of the problems associated with urea based fertilizers and calcium sulfate urea adduct (UCS adduct) based fertilizers. The discovery is premised on using urea in excess of the stoichiometric ratio for production of a UCS adduct-based fertilizer, which is stable and can contain elemental nitrogen at concentrations above 27 wt. %. For example, UCS granules of the present invention can include 33 wt. % to 40 wt. % elemental nitrogen, 2 wt. % to 5 wt. % elemental calcium, and 2 wt. % to 5 wt. % elemental sulfur. In some preferred instances, the UCS granule can be a 33-0-0-based fertilizer. This can be beneficial where higher concentrations of nitrogen are desired and can reduce the amount of UCS adduct fertilizer needed to provide a target amount of nitrogen. Further, it was unexpectedly found that in slurry-based production processes, using urea in excess of stoichiometric ratios allowed for the use of less water to create an acceptable slurry capable of being transported (e.g., pumped) and granulated. This is beneficial in reducing the energy requirements and costs associated with drying the slurry, recycling water, and supplying fresh water. In addition, it was determined that combining sulfuric acid and ammonia into the UCS adduct slurry creates ammonium sulfate through an exothermic reaction. Heat from this reaction can be used to remove all or part of the water from the slurry. This is beneficial in reducing the energy and costs in drying the slurry and also provides the UCS granule with ammonium sulfate fertilizer. Also, it was determined as shown in a non-limiting manner in the Examples that a UCS granule containing MgO substantially increased the hardness and stability of the UCS granule.

In one aspect of the invention, UCS fertilizer granules are described. The UCS fertilizer granule can include a UCS adduct. The UCS adduct can be $CaSO_4 \cdot 4CO(NH_2)_2$. Up to 30 wt. % of the urea in the granule can be comprised in the UCS adduct. Alternatively, at least 30 wt. % of the urea in the granule can be comprised in the UCS adduct. In some embodiments, the UCS fertilizer granule can include 33 wt. % to 40 wt. % elemental nitrogen, 2 wt. % to 5 wt. % elemental calcium, and 2 wt. % to 5 wt. % elemental sulfur. In one instance, the UCS fertilizer granule can include 33 wt. % to 37 wt. % elemental nitrogen, 3 wt. % to 5 wt. % elemental calcium, and 3 wt. % to 5 wt. % elemental sulfur. In another instance the UCS fertilizer granule can include 33 wt. % to 35 wt. % elemental nitrogen, 4 wt. % to 5 wt. % elemental calcium, and 4 wt. % to 5 wt. % elemental sulfur. The free-moisture content of the UCS fertilizer granule can be less than 1 wt. %, preferably less than 0.8 wt. %, less than 0.5 wt. % water or 0.25 wt. % to 0.7 wt. % water. In some instances, the UCS fertilizer granule does not include either phosphorus or potassium, or both. The granule can have a density greater than water (e.g., greater than 1.0 g/mL). The UCS fertilizer granule can be comprised of one or more particles. The particles can include a core and one or more layers covering at least a portion of the core. A first portion of the particles can be the UCS adduct, and a second portion of the particles can form the layer that covers at least a portion of the UCS adduct. The layer can self-assemble during the manufacture of the granule. In certain non-limiting aspects, the first portion of the particles can have an average particle size of 1 up to 15 micrometers, and the second portion of the particles can have an average particle size of 15 to 900 micrometers. The layer can be made up of particles of urea, particles of calcium sulfate, and/or particles of UCS adduct, or any combination or all thereof. In some embodiments, the smaller and larger particles can be elongated particles or can be substantially spherical particles or other shapes or combinations of such shapes. The UCS fertilizer granules can contain MgO. In some instances, the UCS fertilizer granules can contain 0.1 wt. % to 5 wt. % MgO, 1.5 wt. % to 4 wt. % MgO, or 2 wt. % to 4 wt. % MgO. The UCS granules can have a crush strength of 1 N/granule to 50 N/granule, preferably 9 N/granule to 45 N/granule. The UCS fertilizer granules containing MgO preferably have a crush strength of 11 N/granule to 50 N/granule, or any range therein. The UCS fertilizer granules of the present invention can contain ammonium sulfate. In some instances, the UCS fertilizer granules contain 0.1 wt. % to 50 wt. %, 0.1 wt. % to 30 wt. %, 0.1 wt. % to 10 wt. %, 5 wt. % to 10 wt. %, or any range therein of ammonium sulfate. The UCS fertilizer granules of the present invention can be acidic. In some particular aspects, the UCS fertilizer granules, in an aqueous solution, can have a pH of 3 to 6, preferably 4 to 5. Also, the UCS fertilizer granules of the present invention can have an average particle size of 1 millimeter (mm) to 5 mm, preferable about 2 mm to 4 mm. The UCS fertilizer granules of the present invention can also contain one or more additives. The additive can be a fertilizer, a micronutrient, a secondary nutrient, or an organic additive. The additive can be a fertilizer, compound, or composition that provides a nitrogen based fertilizer, a phosphate-based fertilizer, a potassium-based fertilizer, a urea-based fertilizer, a fertilizer providing nitrogen-phosphorus-potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, phosphate rocks, potash, sulfate of potash (SOP), muriate of potash (MOP), kieserite, carnallite, magnesite, dolomite, boric acid, boron (B), copper (Cu), iron (Fe), manganese (Mn), molybdenum (Mo), zinc (Zn), selenium (Se), silicon (Si), free Ca, magnesium (Mg), elemental sulfur (S), neem oil, seaweed extract, bio-stimulants, char, ashes from incineration of animal waste or animal tissues, or any combination thereof.

In another aspect of the present invention, a calcium sulfate urea slurry (UCS slurry) is described. The UCS slurry can be a slurry that when dried can produce the UCS fertilizer granules of the present invention. The UCS slurry can contain urea in stoichiometric excess to the amount needed to produce a calcium sulfate urea adduct. The UCS slurry can contain urea, calcium sulfate, a UCS adduct, and 12 wt. % to 20 wt. % water. In some instances, the UCS slurry contains 12 wt. % to 16 wt. % water. In some instances, the 12 wt. % to 20 wt. % water or 12 wt. % to 16 wt. % water in the slurry is the free moisture content of the slurry. In some instances, the 12 wt. % to 20 wt. % water or 12 wt. % to 16 wt. % water in the slurry is provided by combining water that was not contained or bound by urea and/or calcium sulfate. The UCS slurry can contain MgO, $MgSO_4$, ammonium sulfate, ammonium, sulfuric acid, a fertilizer, a micronutrient, a secondary nutrient, or an organic additive, or a combination thereof.

In yet another aspect of the invention, processes to produce the UCS fertilizer granules of the present invention are described. A process can include (a) combining urea, hydrated or anhydrous calcium sulfate, and water under conditions sufficient to form an aqueous slurry, (b) mixing the aqueous slurry under conditions sufficient to produce a UCS adduct, and (c) removing at least a portion of the water from the aqueous slurry to form the UCS fertilizer granule. The urea can be combined in excess of the stoichiometric ratio for production of a UCS adduct. In some instances, more than four moles of urea are added for every one mole of calcium sulfate. In some instances, 5 moles, 6 moles, 7 moles, 8 moles, 9 moles, 10 moles, or more, or any range or value there between, of urea are added for every one mole of calcium sulfate. In some instances, no other hydrated ingredients are added to the aqueous slurry. The urea used in step (a) can be in the form of prills, particles, molten urea, or a solution having urea dissolved therein. Step (a) conditions can include a temperature of 85° C. to 120° C. In some embodiments, at least 25% or at least 30% of the urea from step (a) is converted into the UCS adduct. In some embodiments, additional calcium sulfate, recycled UCS granules (i.e., granules produced from the process), and/or water can be provided to step (a) and/or (b). Without wishing to be bound by theory, it is believed that in some instances, a layer surrounding at least a portion of the formed UCS adduct self-assembles during this production process of the granule. The aqueous slurry can include a sufficient amount of water such that the composition is transportable by a pump, such as a pump designed to move liquids or a pump designed to move a slurry. In some instances, the aqueous slurry contains a sufficient amount of water to be processed in a continuous process. The aqueous slurry can contain 12 wt. % to 16 wt. % water. In some instances, the 12 wt. % to 16 wt. % of water is added by combining water that is not contained in or bound to the urea or calcium sulfate. The water can be removed from the aqueous slurry at temperature of 80° C. to 100° C., preferably 85° C. to 95° C. or 85° C. to 90° C. or any range or value there between. In some instances, at least a portion of the water is removed by adding sulfuric acid and ammonia to the aqueous slurry to cause an exothermic reaction, wherein heat generated from the exothermic reaction is sufficient to remove at least a portion of the water from the aqueous slurry. In some instances, heat generated from the exothermic reaction is sufficient to remove 1% to 100%, 10% to 99.75%, 10% to 90%, 10% to 50%, 20% to 99%, 30% to 99%, 40% to 99%, 50% to 99%, 60 to 99.5%, 70 to 99.75%, 90 to 99.75%, or any range or value therein of the water in the aqueous slurry. In some instances, heat generated from the exothermic reaction is sufficient to remove water from a slurry that contains 1 wt. % to 20 wt. % water, such as 1, 2, 3, 4, 5, 6, 7, 8, 9, 10, 11, 12, 13, 14, 15, 16, 17, 18, 19, or 20 wt. % water or any range or value there between. The water can be removed by evaporation caused by the heat of the exothermic reaction. The amount of sulfuric acid added can be from about to 1% to 15%, 5% to 10%, or 8% to 11%, or any range or value therein of the weight of the aqueous slurry. The amount of ammonia added can be from about to 0.5 moles to 3 moles, 1 mole to 2.5 moles, 1.5 moles to 2.5 moles, or 2 moles, or any range or value therein for every one mole of sulfuric acid added. In some instances, anhydrous ammonia is added. In some instances, a 98 wt. % sulfuric acid solution is added. The sulfuric acid and ammonia can react to form ammonium sulfate. The ammonium sulfate produced can be from about to 1% to 35%, 5% to 30%, 5% to 20%, or 8% to 11%, or any range therein of the weight of the aqueous slurry. The aqueous slurry can contain MgO. In some instances, $MgSO_4$ can be added to the aqueous slurry to provide MgO. The $MgSO_4$ can be $MgSO_4$ anhydrate, $MgSO_4$ monohydrate, or $MgSO_4$ heptahydrate. The amount of $MgSO_4$ added can be sufficient to provide 1.5 wt. % to 5 wt. %, 2 wt. % to 4 wt. %, or any range thereof of MgO in the UCS fertilizer granules produced by the method.

In another aspect of the present invention, methods of fertilizing are described. A method can include applying a plurality of UCS fertilizer granules of the present invention to a portion of a soil, a crop, or a combination of the soil and the crop. In some embodiments, the soil is at least partially or fully submerged under water (e.g., rice paddy crops) and the granules sink in the water to contact the soil. This can allow for homogenous distribution of the granules to the soil rather than having the granules coalesce together in or on the surface of the water.

Also disclosed in the context of the present invention are blended or compounded fertilizer compositions that include a plurality of UCS fertilizer granules of the present invention mixed with other fertilizers, micronutrients, secondary nutrients, or organic additives. The fertilizers can be particulate in form (e.g., urea, monoammonium phosphate (MAP), diammonium phosphate (DAP), muriate of potash (MOP), and/or sulfate of potash (SOP)). Preferably, the UCS granules and additional fertilizers are compatible with each other (e.g., can contact each other without having a chemical reaction take place). The blended or compounded fertilizer can contain in addition to the UCS fertilizer granules, a nitrogen based fertilizer, a phosphate-based fertilizer, a potassium-based fertilizer, a urea-based fertilizer, a fertilizer providing nitrogen, phosphorus, and potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, phosphate rocks, potash, sulfate of potash (SOP), muriate of potash (MOP), kieserite, carnallite, magnesite, dolomite, boric acid, B, Cu, Fe, Mn, Mo, Zn, Se, Si, Ca, Mg, S, neem oil, seaweed extract, bio-stimulants, char, ashes from incineration of animal waste or animal tissues, etc., or any combination thereof.

Also disclosed are the following Embodiments 1 to 21 of the present invention. Embodiment 1 is a calcium sulfate urea (UCS) fertilizer granule comprising urea, calcium sulfate, and a calcium sulfate urea adduct, wherein the granule comprises 33 wt. % to 40 wt. % elemental nitrogen, 2 wt. % to 5 wt. % elemental calcium, and 2 wt. % to 5 wt. % elemental sulfur. Embodiment 2 is the UCS fertilizer granule of Embodiment 1, wherein at least 30 wt. % of the urea in the granule is comprised in the calcium sulfate urea adduct. Embodiment 3 is the UCS fertilizer granule of any one of Embodiments 1 to 2, comprising 33 wt. % to 37 wt. % elemental nitrogen, 3 wt. % to 5 wt. % elemental calcium, and 3 wt. % to 5 wt. % elemental sulfur. Embodiment 4 is the UCS fertilizer granule of Embodiment 3, comprising 33 wt. % to 35 wt. % elemental nitrogen, 4 wt. % to 5 wt. % elemental calcium, and 4 wt. % to 5 wt. % elemental sulfur. Embodiment 5 is the UCS fertilizer granule of any one of Embodiments 1 to 4, further comprising less than 1 wt. % free moisture, preferably less than 0.8 wt. % free moisture, less than 0.5 wt. % free moisture, or 0.25 wt. % to 0.7 wt. % free moisture. Embodiment 6 is the UCS fertilizer granule of any one of Embodiments 1 to 5, wherein the adduct is $CaSO_4 \cdot 4CO(NH_2)_2$. Embodiment 7 is the UCS fertilizer granule of any one of Embodiments 1 to 6, comprising calcium sulfate urea adduct particles, urea particles, and calcium sulfate particles. Embodiment 8 is the UCS fertilizer granule of any one of Embodiments 1 to 7, further comprising 1.5 wt. % to 4 wt. % MgO and wherein the granule has a hardness of 10 N/granule to 50 N/granule. Embodiment 9 is the UCS fertilizer granule of any one of Embodiments 1 to 8, further comprising ammonium sulfate. Embodiment 10 is a fertilizer blend or compounded fertilizer comprising the UCS fertilizer granule of any one of Embodiments 1 to 9, and at least one additional component, preferably the at least one additional component is a fertilizer. Embodiment 11 is the fertilizer blend or compounded fertilizer of Embodiment 10, wherein the at least one additional component is a phosphate-based fertilizer, a urea-based fertilizer, or a potassium-based fertilizer. Embodiment 12 is the fertilizer blend or compounded fertilizer of any one of Embodiments 10 to 11, wherein the at least one additional component is a micronutrient, a secondary nutrient, an organic additive, or any combination thereof. Embodiment 13 is the fertilizer blend or compounded fertilizer of any one of Embodiments 10 to 12, wherein the at least one additional component is sulfate of potash (SOP), wherein the fertilizer blend or compounded fertilizer comprises 19 wt. % to 33 wt. % elemental nitrogen, 2 wt. % to 5 wt. % elemental calcium, 5 wt. % to 10 wt. % elemental sulfur, and 0.001 wt. % to 20 wt. % $K_2O$. Embodiment 14 is a method of making a calcium sulfate urea (UCS) fertilizer granule of any one of Embodiments 1 to 9, the method comprising: combining urea, calcium sulfate, and water to form an aqueous slurry, wherein urea is combined in excess of the stoichiometric ratio for production of a calcium sulfate urea adduct; mixing the aqueous slurry under conditions sufficient to produce a calcium sulfate urea adduct; and removing at least a portion of the water from the aqueous slurry to form the calcium sulfate urea (UCS) fertilizer granule. Embodiment 15 is the method of Embodiment 14, wherein the aqueous slurry comprises 12 wt. % to 16 wt. % water, and preferably wherein combining urea, calcium sulfate, and water comprises combining 12 wt. % to 16 wt. % of water in addition to water contained in the urea and calcium sulfate. Embodiment 16 is the method of any one of Embodiments 14 to 15, wherein removing at least a portion of the water from the aqueous slurry comprises adding sulfuric acid and ammonia to cause an exothermic reaction, wherein heat generated from the exothermic reaction is sufficient to remove at least a portion of the water from the aqueous slurry. Embodiment 17 is the method of Embodiment 16, wherein the amount of sulfuric acid added is from about 5% to 15% of the weight of the aqueous slurry. Embodiment 18 is the method of any of Embodiments 16 to 17, wherein from about 1.5 to 2.5 moles of ammonia are added for every one mole of sulfuric acid. Embodiment 19 is the method of any one of Embodiments 14 to 18, further comprising adding a sufficient amount of $MgSO_4$ to obtain a calcium sulfate urea (UCS) fertilizer granule further comprising 1.5 wt. % to 5 wt. % MgO, preferably 2 wt. % to 4 wt. % MgO. Embodiment 20 is a calcium sulfate urea (UCS) slurry comprising 12 to 16% water and urea, calcium sulfate, and a calcium sulfate urea adduct in amounts such that when the slurry is dried, the dried slurry comprises 33 wt. % to 40 wt. % elemental nitrogen, 2 wt. % to 5 wt. % elemental calcium, and 2 wt. % to 5 wt. % elemental sulfur. Embodiment 21 is a method of fertilizing, the method comprising applying a UCS fertilizer granule, a fertilizer blend, or a compounded fertilizer of any one of Embodiments 1 to 13, or any combination thereof, to a portion of a soil, a crop, or the soil and the crop.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to bio-stimulants, urease inhibitors, and nitrification inhibitors. In some particular instances, the fertilizer is urea.

The term "micronutrient" is defined as a chemical element or substance required in trace amounts for the normal growth and development of a plant. Non-limiting examples of micronutrients include B, Cu, Fe, Mn, Mo, Zn, Se, and Si or compounds thereof.

The term "secondary nutrient" is defined as a chemical element or substance required in moderate amounts for plant growth and are less likely to limit crop growth in comparison to N, P, and K. Non-limiting examples of secondary nutrients include Ca, Mg, and S.

The term "organic agent" is defined as a substance that is produced by or part of an organism. Non-limiting examples of organic agents suitable for a fertilizer include neem oil, seaweed extract, bio-stimulants, char, ashes from incineration of animal waste or animal tissues, and diatomaceous earth.

The term "granule" can include a solid material. A granule can have a variety of different shapes, non-limiting examples of which include a spherical, a puck, an oval, a rod, an oblong, or a random shape.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "free moisture content," as the term used in this specification and/or claims means the water or moisture not associated with calcium sulfate dihydrate or hemihydrate. This term means any other free water or moisture.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The UCS fertilizer granules of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the UCS fertilizer granules of the present invention is the presence of a stable UCS adduct containing 33 wt. % to 40 wt. % elemental nitrogen, 2 wt. % to 5 wt. % elemental calcium, and 2 wt. % to 5 wt.

% elemental sulfur. Further, the stable UCS fertilizer granules can be produced using urea in stoichiometric excess.

BRIEF DESCRIPTION OF THE DRAWINGS

Advantages of the present invention may become apparent to those skilled in the art with the benefit of the following detailed description and upon reference to the accompanying drawings.

Figure 1A:
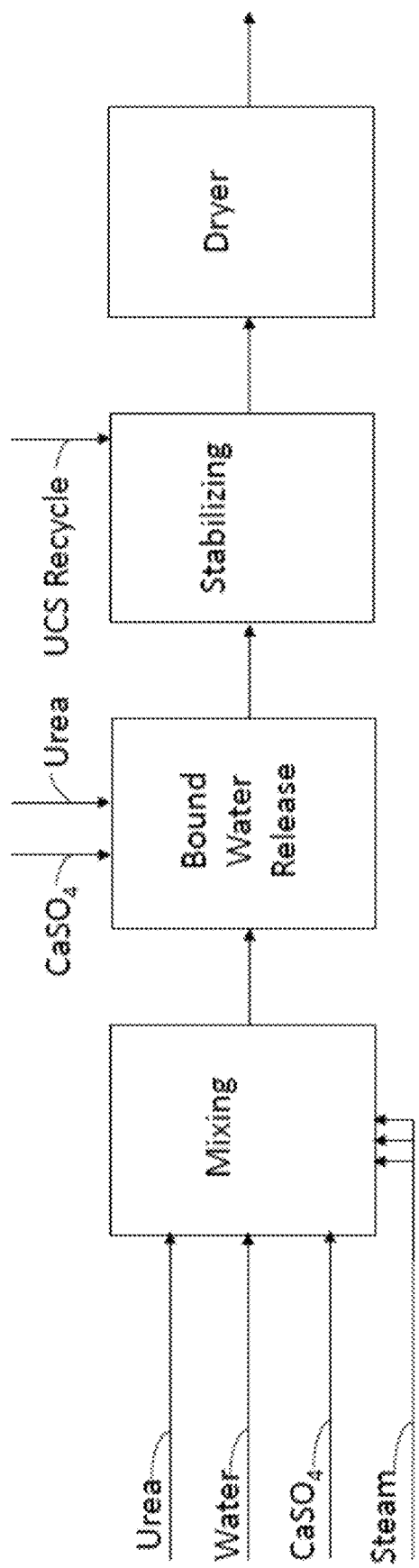
FIGS. 1A-1C are: 1A a schematic of a system that can be used to produce UCS fertilizer granules of the present invention in which solid urea can be used as a starting material; 1B a schematic of a system that can be used where urea solution, urea melt, or a calcium sulfate slurry can be used as reactants material; and 1C a schematic of a system that can be used where an exothermic reaction can be used to remove part of the water of a UCS adduct containing slurry.

While the invention is susceptible to various modifications and alternative forms, specific embodiments thereof are shown by way of example in the drawings. The drawings may not be to scale.

DETAILED DESCRIPTION OF THE INVENTION

The UCS granule of the present invention can include a UCS adduct formed from the following reaction:

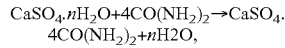

$$CaSO_4 \cdot nH_2O + 4CO(NH_2)_2 \rightarrow CaSO_4 \cdot 4CO(NH_2)_2 + nH_2O,$$

where n is a value from 0 to 2 (e.g., 0, 0.5, 1, 2).

The UCS granule can be produced by using urea in excess of the stoichiometric ratio for production of a UCS adduct (e.g., more than four moles of urea for every one mole of calcium sulfate). The UCS granule produced is stable and can contain elemental nitrogen at concentrations above 27 wt. % (e.g., at least, equal to, or between any two of 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, and 40 wt. %). For example, UCS granules of the present invention can include 33, 34, 35, 36, 37, 38, 39, or 40 wt. % elemental nitrogen, 2, 3, 4, or 5 wt. % elemental calcium, and 2, 3, 4, or 5 wt. % elemental sulfur. UCS granules of the present invention can include 33 wt. % to 37 wt. % elemental nitrogen, 3 wt. % to 5 wt. % elemental calcium, and 3 wt. % to 5 wt. % elemental sulfur. The UCS fertilizer granule can include 33 wt. % to 35 wt. % elemental nitrogen, 4 wt. % to 5 wt. % elemental calcium, and 4 wt. % to 5 wt. % elemental sulfur. UCS granules of the present invention can include 33 wt. %, 34 wt. %, or 35 wt. % elemental nitrogen, 4 wt. % or 5 wt. % elemental calcium, and 4 wt. % or 5 wt. % elemental sulfur. UCS granules of the present invention can include 33 wt. % or 34 wt. % elemental nitrogen, 4 wt. % or 5 wt. % elemental calcium, and 4 wt. % or 5 wt. % elemental sulfur. UCS granules of the present invention can include 33 wt. % elemental nitrogen, 5 wt. % elemental calcium, and 5 wt. % elemental sulfur. UCS granules of the present invention can include 34 wt. % elemental nitrogen, 5.5 wt. % elemental calcium, and 5 wt. % elemental sulfur. In some instances, the granule does not include phosphorus, potassium, or both. In some preferred instances, the UCS granule can be a 33-0-0-based fertilizer. This can be beneficial where higher concentrations of nitrogen are desired in a stable granulated fertilizer and can be beneficial by reducing the amount of material needed to provide nitrogen in a stable fertilizer.

The UCS granule produced can also contain low amounts of moisture. The free-moisture content of the granule can be less than 1 wt. %, preferably less than 0.8 wt. %, less than 0.5 wt. % water or 0.25 wt. % to 0.7 wt. % water. In some instances, the free moisture content is 1, 0.9, 0.8, 0.7, 0.6, 0.5, 0.4, 0.3, 0.2, 0.1, or 0 wt. %.

Further, it was unexpectedly found that when using excess urea to produce the UCS adduct, less water is needed to create a slurry that is capable of being transported (e.g., pumped) and is suitable for granulation. This is beneficial in reducing the energy and costs of drying the slurry, recycling the water, and providing fresh water. In addition, it was determined that combining sulfuric acid and ammonia into the UCS adduct slurry causes an exothermic reaction sufficient to remove all or part of the water in the slurry. This is beneficial in reducing the energy and costs in drying the slurry. The product of the exothermic reaction, ammonium sulfate, also benefits the fertilizer, as ammonium sulfate is a readily soluble fertilizer that can be quickly available to crops once applied. Also, it was determined that a UCS granule containing MgO substantially increases the hardness and stability of the UCS granule. In some instances, $MgSO_4$ can be added into the UCS granule or UCS adduct slurry to provide the MgO. In particularly preferred embodiments, fertilizer compositions comprising a plurality of granules of the present invention are in a dry form and not in a slurry form.

In some instances, the surface of the UCS adduct can include a layer having urea, calcium sulfate, or additional UCS adduct, or any combination thereof or all thereof. By way of example the layer can be formed on at least a portion of the outer surface of the UCS adduct, and the layer can include: (1) urea; (2) calcium sulfate; (3) additional UCS adduct; (4) urea and calcium sulfate; (5) urea and additional UCS adduct; (6) calcium sulfate and additional UCS adduct; (7) or urea, calcium sulfate, and additional UCS adduct. The layer can self-form or self-assemble during the production process of the UCS granule. The urea, calcium sulfate, and/or UCS adduct in the layer can be in particulate form. The USC adduct can also include a layer that has urea, calcium sulfate, or additional UCS adduct, or a combination thereof or all thereof. The layer can be particles of urea, calcium sulfate, or additional UCS adduct. Also, and without wishing to be bound by theory, it is believed that the layer self-assembles during the manufacture of the granule.

The granule can be comprised of one or more particles. A first portion of the particles can be the calcium sulfate urea adduct, and a second portion of the particles can form a layer that covers at least a portion of the calcium sulfate urea adduct. In certain non-limiting aspects, the first portion of the particles can have an average particle size of 1, 2, 3, 4, 5, 6, 7, 8, 9, 10, 11, 12, 13, 14, or 15 micrometers, and the second portion of the particles can have an average particle size of 15, 20, 30, 40, 50, 60, 70, 80, 90, 100, 200, 300, 400, 500, 600, 700, 800, or 900 micrometers or any size there between. The layer can be made up of particles of urea, particles of calcium sulfate, and/or particles of calcium sulfate urea adduct, or any combination, or all thereof. In some embodiments, the smaller and larger particles can be elongated particles or can be substantially spherical particles or other shapes, or combinations of such shapes. Non-limiting examples of shapes include a spherical, a puck, an oval, a rod, an oblong, or a random shape.

The UCS granules can have a crush strength of 1, 2, 3, 4, 5, 6, 7, 8, 9, 10 kg/granule, or more, or any amount there between, preferably 2 kg/granule to 5 kg/granule.

An additional non-limiting benefits of the UCS granules of the present invention is that they can be a good acidifier, which can contribute to efficient nutrient distribution to the soil and/or plants. Even further, the granules can increase nutrient uptake by the plants due, at least in part, to these acidic feature. In some particular aspects, the granules can have a pH of 3, 3.5, 4, 4.5, 5, 5.5, or 6, preferably 4 to 5 when mixed with water. Also, the granules of the present invention can have an average size of 1, 1.5, 2, 2.5, 3, 3.5, 4, 4.5, or 5 mm, preferably about 2 mm to 4 mm. It is also believed that the contents and/or structure of the granules of the present invention can aid in reducing nitrogen volatilization.

These and other non-limiting aspects of the present invention are discussed in further detail in the following sections.

A. Process to Produce UCS Fertilizer Granules

Figure 1B:
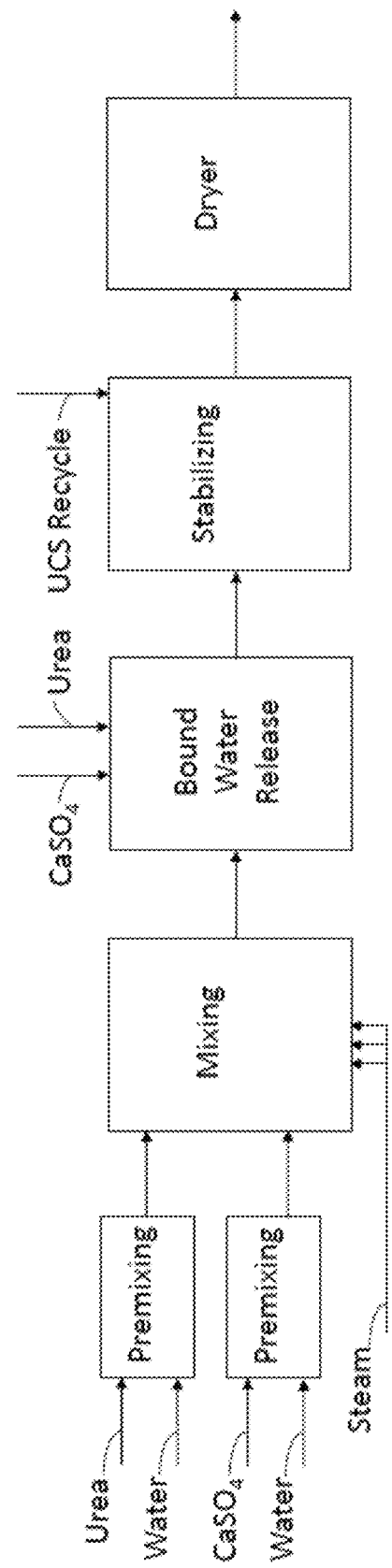
Figure 1C:
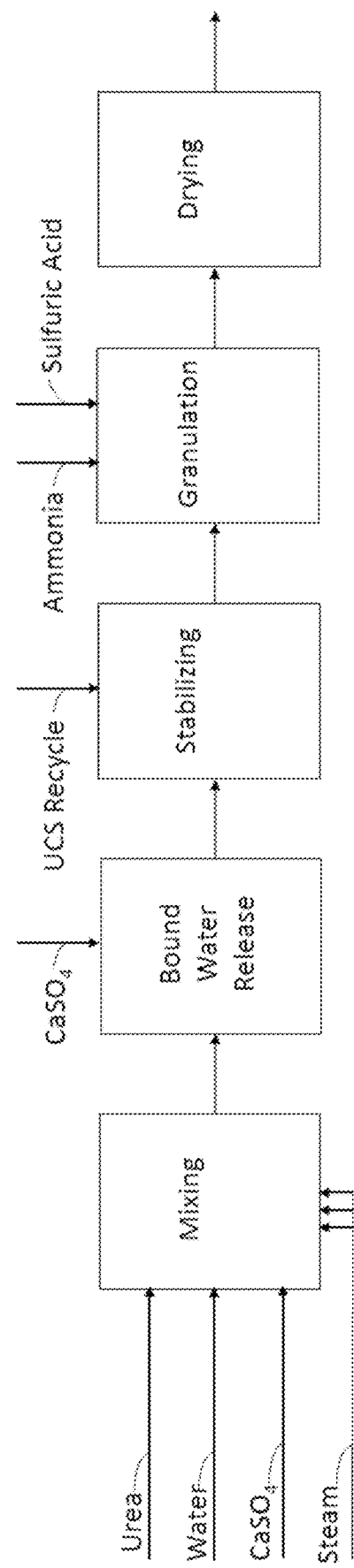

The UCS granules of the present invention can be made using a granulation system shown in FIG. 1A, FIG. 1B, or FIG. 1C, or a combination thereof. The granulation system can be a continuous process capable of handling slurries. The granulation system can include a mixing zone (mixing). The mixing zone can be in a continuous stirred-tank reactor. In the mixing zone, solid urea (e.g., fresh urea prills) (FIG. 1A), calcium sulfate (e.g., gypsum), and water can be combined in a mixing unit (e.g., a continuous stirred-tank reactor) to form an aqueous slurry. In some instances, a stoichiometric excess of urea, such as more than four moles of urea for every one mole of calcium sulfate, is mixed in the mixing zone. In some instances, the excess urea is at least, equal to, or between any two of 5 moles, 6 moles, 7 moles, 8 moles, 9 moles, and 10 moles or more of urea for every one mole of calcium sulfate. In some instances, the water content of the aqueous slurry is 12% to 20% by weight, 12% to 16% by weight, or 13% to 15% by weight. It was unexpectedly found that using this amount of water still produced a slurry that acted like a fluid and was pumpable. In some instances, the water content is provided by water that is not bound or contained in the urea or calcium sulfate. A high level of mixing (e.g., agitator rpm of greater than 200 rpm) can be used to promote formation of the UCS adduct to decrease the amount of heat required for the formation. Additionally or alternatively, urea solution (See, FIG. 1B) and/or urea melt can be used, and can be introduced to the mixing zone. Calcium sulfate in any form of hydration or non-hydration, (e.g., anhydrous calcium sulfate, calcium sulfate hemihydrate, and calcium sulfate dihydrate) can be used as the calcium sulfate. These calcium sulfates with varying degrees on hydration can then be converted to calcium sulfate dihydrate suitable for the UCS adduct formation. Additionally or alternatively, a calcium sulfate slurry (See, FIG. 1B) can be used, and can be introduced to the mixing zone. Urea dissolution is an endothermic process. Optionally, the temperature of the mixing zone can be increased to 1) increase the formation of the adduct, 2) decrease the amount of water needed, and/or 3) decrease the viscosity of the aqueous slurry. Heat can be provided by any means suitable or known. In some instances, steam is used. The optional use of steam can inhibit absorption of heat from the surroundings and hence lowering the temperature requirement in the mixing zone without additional energy. With steam injection, the urea can be rapidly dissolved while the surrounding material is maintained at the high temperature, which can preferably be about 80° C. to 100° C. or any range or value therein. Without wishing to be bound by theory, it is believed that the urea should be in solution (partially or fully solubilized) to exchange urea for water in the calcium sulfate dihydrate composition so as to form the USC adduct. Additional active or inactive ingredients can be added to the aqueous slurry while in the mixing zone or at any other time.

Alternatively, urea can be dissolved in an aqueous solution, calcium sulfate can be formed into a slurry, or both can be performed before entry into the mixing zone (premixing) (FIG. 1B). Accordingly, all or part of the water that enters the mixing zone can enter in a urea solution and/or calcium sulfate slurry.

Also as an alternative, the aqueous slurry containing UCS adduct produced in the mixing zone can exit the mixing zone and enter a second mixing zone where additional active or inactive ingredients can be added to the aqueous slurry. In some embodiments, ammonia and sulfuric acid are added to produce ammonium sulfate in an exothermic reaction, which can further drive production of UCS adduct and evaporate water from the slurry. Ammonia and sulfuric acid can be added to any one of the zones to produce ammonium sulfate and/or to produce heat.

In some instances, the aqueous slurry exits the mixing zone or second mixing zone and can enter a bound water release zone (bound water release). In the bound water release zone, the aqueous slurry can be mixed with unreacted calcium sulfate and optional recycled UCS adduct and/or optional urea. As UCS adduct is produced, bound water within the calcium sulfate is released, further promoting the conversion to UCS adduct. The temperature of the bound water release zone can be 80° C. to 100° C., preferably 85° C. to 95° C., or at least, equal to, or between any two of 80° C., 85° C., 90° C., and 95° C.

Though shown in the FIGURES, optionally, the slurry can exit the bound water release zone and enter a stabilizing zone (stabilizing) where mixing of the mixture of urea, calcium sulfate, UCS adduct, and water can be continued. In some embodiments, UCS adduct recycle (UCS recycle) can be added to any one of the zones to help maintain consistency of the mixture. Additional active or inactive ingredients can be added to the slurry.

The conditions of the material exiting the stabilizing zone, bound water zone, mixing zone, or second mixing zone can be a semi-wet granule, which can easily form "balls when compresses with the hands." If the material is too dry, then granulation is decreased leading to smaller product fraction in the material exiting the dryer. If the material is too "wet" (tending towards mud) then there is a risk that the UCS "mud" will stick to the surfaces of the dryer, leading to building up on the dryer surface. In some instances, the material can be formed into granules during or after exiting the stabilizing zone.

Drying the granule can enable agglomeration to form solid granules and can also create crystal bridges to enable crystallization of the UCS adduct. In some embodiments, ammonia and sulfuric acid are added to the material in the stabilizing zone, and/or an optional granulation zone (FIG. 1C), and/or added to the material after leaving the bound water release zone and/or the stabilizing zone. In some embodiments, the granules are dried or further dried in a drying zone (drying) (FIG. 1C). The addition of ammonia and sulfuric acid produces ammonium sulfate in an exothermic reaction, which can further drive production of UCS adduct and/or evaporate water from the material. In some instances, sufficient amounts of ammonia and sulfuric acid are added to remove all or substantially all of the free water. In some instances, the material is sufficiently dried by the exothermic reaction so that the material does not or does not need to subsequently enter a dryer or drying zone.

The material can enter a dryer (dryer) (e.g., a rotating dryer) to reduce the amount of free water in the material (FIG. 1A and FIG. 1C). The formation of granules can also occur or continue during the drying of the material. Observations of the material entering and exiting the drying zone confirmed that granulation and UCS adduct conversion continues within the dryer. Operating conditions of the dryer were found to be highly significant to achieve the desired level of drying while promoting urea adduct conversion. The operating temperature of the dryer can also be used to adjust the temperature at which the UCS recycle materials re-enters the granulation system. Continuous operation can be achieved with dryer exit temperatures (as measured by the exit gas) between 80° C. to 90° C., preferably 85° C. to 88° C. or any value or range therein. If the exit temperature rises above 90° C. to 95° C., the composition may melt creating a molten mass inside the drier.

B. Blended or Compounded Fertilizer Compositions

The UCS granules of the present invention can also be included in a blended or compounded fertilizer composition comprising other fertilizers, such as other fertilizer granules. Additional fertilizers can be chosen based on the particular needs of certain types of soil, climate, or other growing conditions to maximize the efficacy of the UCS granules in enhancing plant growth and crop yield. The other fertilizer granules can be granules of urea, single super phosphate (SSP), triple super phosphate (TSP), ammonium sulfate, monoammonium phosphate (MAP), diammonium phosphate (DAP), muriate of potash (MOP), and/or sulfate of potash (SOP), and the like.

C. Method of Using the UCS Fertilizer Granules

The UCS fertilizer granules of the present invention can be used in methods of increasing the amount of nitrogen in soil and of enhancing plant growth. Such methods can include applying to the soil an effective amount of a composition comprising the UCS fertilizer granule of the present invention. The method may include increasing the growth and yield of crops, trees, ornamentals, etc. such as, for example, palm, coconut, rice, wheat, corn, barley, oats, and soybeans. The method can include applying UCS fertilizer granules of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

The effectiveness of compositions comprising the UCS fertilizer granules of the present invention can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions.

As discussed above, one of the unique aspects of the UCS fertilizer granules of the present invention is that they can have a density that is greater than water. This can allow the granules to sink in water rather than float in water. This can be especially beneficial in instances where application is intended to a crop that is at least partially or fully submerged in water. A non-limiting example of such a crop is rice, as the ground in a rice paddy is typically submerged in water. Thus, application of UCS granules to such crops can be performed such that the granules are homogenously distributed on the ground that is submerged under water. By comparison, granules that have a density that is less than water would have a tendency to remain in or on the water surface, which could result in washing away of the granules and/or coalescence of the granules, either of which would not achieve homogenous distribution of the granules to the ground that is submerged under water.

D. Compositions

The UCS granules can be used alone or in combination with other fertilizer actives and micronutrients. The other fertilizer actives and micronutrients can be added with urea and calcium sulfate at the beginning of the granulation process or at any later stage.

Non-limiting examples of additional additives can be micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients may include lime, gypsum, superphosphate, or a combination thereof. For example, in some instances the UCS granule can contain calcium sulfate, potassium sulfate, magnesium sulfate or a combination thereof.

In one aspect, the UCS granules can comprise one or more inhibitors. The inhibitor can be a urease inhibitor or a nitrification inhibitor, or a combination thereof. In one aspect, UCS granule can comprise a urease inhibitor and a nitrification inhibitor. In one aspect, the inhibitor can be a urease inhibitor. Suitable urease inhibitors include, but are not limited to, N-(n-butyl) thiophosphoric triamide (NBTPT) and phenylphosphorodiamidate (PPDA). In one aspect, the UCS fertilizer granule can comprise NBTPT or PPDA, or a combination thereof. In another aspect, the inhibitor can be a nitrification inhibitor. Suitable nitrification inhibitors include, but are not limited to, 3,4-dimethylpyrazole phosphate (DMPP), dicyandiamide (DCD), thiourea (TU), 2-chloro-6-(trichloromethyl)-pyridine (Nitrapyrin), 5-ethoxy-3-trichloromethyl-1,2,4-thiadiazol, which is sold under the tradename Terrazole®, by OHP Inc., USA, 2-amino 4-chloro 6-methyl pyrimidine (AM), 2-mercaptobenzothiazole (MBT), or 2-sulfanilamidothiazole (ST), and any combination thereof. In one aspect, nitrification inhibitor can comprise DMPP, DCD, TU, nitrapyrin, 5-ethoxy-3-trichloromethyl-1,2,4-thiadiazol, AM, MBT or ST, or a combination thereof. In one aspect, the UCS fertilizer granule can comprise NBTPT, DMPP, TU, DCD, PPDA, nitrapyrin, 5-ethoxy-3-trichloromethyl-1,2,4-thiadiazol, AM, MBT, or ST or a combination thereof.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Lab Scale Process to Prepare UCS Fertilizer Granules

A lab scale process for making a UCS fertilizer granule of the present invention was performed by using the system described in FIGS. 1A-1C and in Section A of the Detailed Description of the Invention. It was unexpectedly found that when a stoichiometric excess of urea (e.g., more than four moles of urea for every one mole of calcium sulfate) was used in the reaction having moisture contents as low as 12 wt. % ensured rapid conversion and maintained the slurry within an acceptable fluid like or "pumpable" condition.

Mixtures of urea and gypsum ($CaSO_4 \cdot 2H_2O$) were added to hot water with different ratios of urea, gypsum, and water. The urea had a nitrogen content of about 46 wt. % and a moisture content of about 0.3 wt. % or less. The gypsum had a calcium content of about 24 wt. % and sulfur content of about 18 wt. % and a moisture content of about 25 wt. %. Extra water was added to form a slurry. The aqueous mixture was heated to about 90° C. and stirred constantly for 15 minutes. Repeat sample preparation at different reaction temperatures (80° C., 90° C., 100° C., 110° C.) and different stirring (resident) times (10 & 15 minutes) were tested. The reactions used prilled urea, grinded urea, melt urea, and 70 wt. % urea solution, or combinations thereof. The reactions were performed at room temperature.

Conclusions about the lab scale process include the following. (1) Experiments based on slurry formation determined that a temperature of 80° C. was optimal for urea conversion. Increasing the temperature to formation of urea conversion to 110° C. provided few improvements. Using urea melt for the urea conversion also did not provide improvements to the urea conversion. (2) Water content of the raw materials was determined to be significant. Without wishing to be bound by theory, it is believed that water acted as the conversion "initiator," dissolving the urea and, thus making it available to replace the hydration water within the gypsum. From the slurry experiments it was determined that a moisture content of 18 wt. % to 22 wt. % when using urea concentrations at or below stoichiometric concentrations for the formation of UCS adduct ensured both rapid conversion of the urea and maintained the slurry within an acceptable fluid like or "pumpable" condition without solidification of the slurry. Surprisingly, when a stoichiometric excess of urea was used in the reaction with moisture contents as low as 12 wt. % rapid conversion was realized and the slurry was maintained within an acceptable fluid like "pumpable" condition without solidification of the slurry. From the drum granulation tests it was determined that a moisture content above 5 wt. % was preferred to observe urea conversion. However, the lab drum tests were unable to "maintain" the moisture conditions once started so it was likely that moisture was lost throughout the tests, thus slowing the rate of conversion. (3) Agitation promoted interaction between the urea (which rapidly dissolved to form a solution) and the gypsum.

Example 2

Characterization of the UCS Slurry and UCS Fertilizer Granules

Fertilizer blends or compounded fertilizers containing free urea (urea not bound in an adduct), are difficult to granulate and are typically not stable because of urea's reactivity with other fertilizers. Urea can react to produce water, which can dissolve the remaining free urea and increase the ability of urea to react with the other components in the fertilizer. This chain reaction can quickly render a fertilizer unusable. Accordingly, in the past, the aim of production of urea adducts for use in fertilizers, such as UCS adducts, has been to bind as much free urea in the adduct as possible. Therefore, production schemes for UCS adducts have in the past avoided using urea in stoichiometric excesses amounts, so that free urea in the product can be minimized or avoided.

It was unexpectedly found that using a stoichiometric excess of urea in the production of the UCS adduct (more than four moles of urea for every one mole of calcium sulfate) produced a stable UCS adduct containing product that also contained a higher amount of elemental nitrogen (e.g. 33 wt. % to 40 wt. %) than was possible using other methods (e.g., maximum 27 wt. % elemental nitrogen using stoichiometric amounts of urea). The stable product provided an attractive fertilizer alone or in combination with other beneficial agents for plants. Not to be bound by theory, it is believed that the crystal structure of the UCS adduct can allow for additional urea molecules to be bound in UCS adduct crystals either as part of the crystal lattice or UCS adduct crystallizes around free urea, shielding it from reacting with other components of the UCS granule and other fertilizers.

Table 1 provide characterization data for the UCS slurry and UCS granules using the slurry production process described in FIGS. 1A-1C and in Section A of the Detailed Description of the Invention. The reaction was performed with ratios of reactants to provide about ~717 kg of urea/metric ton of UCS final product and ~283 kg gypsum/metric ton of UCS final product.

TABLE 1

(Average Chemical & Physical Analysis for
UCS Granule 33 – 0 – 0 + 5% S + 5% Ca)

ANALYSIS OF UCS SLURRY FOR
PRODUCTION OF UCS GRANULE

| Water Quantity (wt. %) | Total Nitrogen (wt. %) | Sulfur (wt. %) | Calcium (wt. %) |
| --- | --- | --- | --- |
| 0 | 33 | 5 | 5 |
| 1 | 32.67 | 4.95 | 4.95 |
| 2 | 32.34 | 4.9 | 4.9 |
| 3 | 32.01 | 4.85 | 4.85 |
| 4 | 31.68 | 4.8 | 4.8 |
| 5 | 31.35 | 4.75 | 4.75 |
| 6 | 31.02 | 4.7 | 4.7 |
| 7 | 30.69 | 4.65 | 4.65 |
| 8 | 30.36 | 4.6 | 4.6 |
| 9 | 30.03 | 4.55 | 4.55 |
| 10 | 29.7 | 4.5 | 4.5 |
| 11 | 29.37 | 4.45 | 4.45 |
| 12 | 29.04 | 4.4 | 4.4 |
| 13 | 28.71 | 4.35 | 4.35 |
| 14 | 28.38 | 4.3 | 4.3 |
| 15 | 28.05 | 4.25 | 4.25 |
| 16 | 27.72 | 4.2 | 4.2 |
| 17 | 27.39 | 4.15 | 4.15 |
| 18 | 27.06 | 4.1 | 4.1 |
| 19 | 26.73 | 4.05 | 4.05 |
| 20 | 26.4 | 4 | 4 |
| 21 | 26.07 | 3.95 | 3.95 |
| 22 | 25.74 | 3.9 | 3.9 |
| 23 | 25.41 | 3.85 | 3.85 |
| 24 | 25.08 | 3.8 | 3.8 |
| 25 | 24.75 | 3.75 | 3.75 |
| 26 | 24.42 | 3.7 | 3.7 |
| 27 | 24.09 | 3.65 | 3.65 |
| 28 | 23.76 | 3.6 | 3.6 |
| 29 | 23.43 | 3.55 | 3.55 |
| 30 | 23.1 | 3.5 | 3.5 |

ANALYSIS OF GRANULE
Chemical Analysis of Granule (wt. % of Granule)

| | |
| --- | --- |
| Total Nitrogen | 34.2 |
| Sulfur | 5.1 |
| Calcium | 5.5 |
| Moisture | 0.54 |

Physical Analysis of Granule

| | |
| --- | --- |
| % of batch with Particle size > 4 mm | 20% |
| % of batch with Particle size 2-4 mm | 58% |
| % of batch with Particle size 1-4 mm | 78% |
| % of batch with Particle size 1-2 mm | 20% |
| % of batch with Particle size < 1 mm | 1% |
| Crush Strength | 5.1 kgf/granule |

Chemical analysis for nitrogen content was determined by the Total Nitrogen in Fertilizer by Combustion Technique described in AOAC official Method 993.13.1996 (AOAC International). Calcium content was determined by the Calcium by Atomic Absorption Spectrometric Method described in ISO 10084, 1992 (International Organization for Standardization). Sulfur content was determined by the Gravimetric Barium Sulfate Method described in ISO 10084, 1992 (International Organization for Standardization).

Particle size was determined using standard sieve test methods.

Crush strength was determined by a commercial compression tester (Chatillon Compression Tester). Individual granules between 2 to 4 mm in diameter were placed on a mounted flat (stainless steel) surface and pressure was applied by a flat-end rod (stainless steel) attached to the compression tester. A gauge mounted in the compression tester measured the pressure (in kilograms) required to fracture the granule. At least 25 granules were tested and the average of these measurements was taken as crush strength in kilograms. (Ref. method #IFDC S-11S Manual for determining physical properties of fertilizer-IFDC 1993). It was shown that the formulation had an acceptable crush strength (>2 kgf/granule). See Table 1.

Example 3

Addition of Sulfuric Acid and Ammonia

When UCS is manufactured via slurry processes, the resulting slurry requires a water content sufficient to maintain the fluid like condition of the slurry from the reactor system to a granulator. This water has two main disadvantages. First, the recycle ratio in the granulation has to be increased significantly to absorb the slurry moisture. Recycle ratio can be around 8-10:1 which leads to higher energy costs and less flexible operating conditions. Second, most of the slurry water has to be evaporated to produce a granulated product.

It has been determined that by manufacturing ammonium sulfate in the aqueous slurry (in-situ) by utilizing the exothermic reaction of ammonia with sulfuric acid, all or a portion of the water in the aqueous slurry was evaporated from the slurry. In this way, the costs of drying the aqueous slurry by other means was avoided or reduced. In addition, the presence of ammonium sulfate within the UCS product enhanced the fertilizer performance, as ammonium sulfate, a water soluble fertilizer, was readily available to crops once the UCS product was applied. It was also found that the quantity of ammonium sulfate produced removed all or almost all of the free water in the aqueous slurry and did not adversely affect the elemental nitrogen or elemental sulfur content of the UCS product.

The amount of water that was removed from the aqueous slurry was determined by varying amounts of ammonia and sulfuric acid for production of ammonium sulfate. Two moles of ammonium were used for every one mole of sulfuric acid. Anhydrous ammonium and a solution of 98 wt. % sulfuric acid were used to minimize the amount of water added to the slurry. Table 2 includes a summary of the results for removal of water by production of ammonium sulfate. It was found that production of ammonium sulfate in amounts of 9 wt. % to 10 wt. % of the aqueous slurry can remove up to 78.4 kg water/metric ton of UCS produced. Use of additional ammonium sulfate can evaporate a larger amount of water. As discussed above, it was also found, that less than 20 wt. % water was needed in the aqueous slurry to produce the UCS product, in some instances as low as 12 wt. % water was used and the slurry maintained a fluid like condition. Accordingly, producing ammonium sulfate in the aqueous slurry can remove all, substantially all, or part of the free water in the aqueous slurry. Additional amounts of ammonium sulfate can be produced in situ or added into the slurry as well. In some cases, ammonium sulfate is produced in amounts up to 30 wt. % of the UCS product and amounts up to 50 wt. % can be added.

TABLE 2

(Removal of Water by Production of Ammonium Sulfate)

Ammonium Sulfate Produced (wt. % of slurry)

| | 10 | 9 | 8 | 7 | 6 | 5 | 4 | 3 | 2 | 1 | 0 |
|---|---|---|---|---|---|---|---|---|---|---|---|
| Water Evaporated (kg/metric ton of UCS product) | 78.4 | 70.6 | 62.8 | 54.9 | 47.1 | 39.2 | 31.4 | 23.5 | 15.7 | 7.8 | 0.0 |

Example 4

Increasing Crush Strength

It is desirable to have fertilizer granules that are sufficiently hard to avoid or eliminate crushing during handling, shipping, storage, and application of the granules. Dust created from the crushing of fertilizer granules can be an irritant and dangerous if inhaled or ingested. The crushing of fertilizer granules can also lead to the loss of product. Hardness of granules containing UCS and 2 wt. % or more MgO were tested by the same assays described above in Example 2 and it was determined that MgO substantially improved crush strength. In some instances, MgO content is effected by addition of $MgSO_4$ in the granule. As non-limiting examples, 2 wt. % of MgO in granules containing UCS provided a granule hardness of 12.8 N/granule, a 19.6% increase of hardness over a granule containing UCS without MgO (10.7 N/granule). As another non-limiting example, 4 wt. % of MgO in granules containing UCS provided a granule hardness of 41.6 N/granule, a 288.8% increase of hardness over a granule containing UCS without MgO.

It was found that 2 wt. % of MgO was obtained in the UCS product of the current invention by adding 125.0 kg of $MgSO_4$ heptahydrate per metric ton of the UCS product. $MgSO_4$ anhydrate, $MgSO_4$ monohydrate, or $MgSO_4$ heptahydrate can also or alternatively be used to add the MgO into the granules.

Example 5

Compatibility

The stable UCS adduct granules of the present invention contain higher amounts of elemental nitrogen than other stable UCS adduct granules. The increased stability over urea, decreased production costs, and higher nitrogen content than other UCS adduct granules make the UCS adduct granules of the present invention an attractive fertilizer product alone and in blended or compounded fertilizers. It has been determined that the UCS adduct granules were compatible with a wide range of typical fertilizer raw materials such as DAP, MAP, urea, MOP, and SOP and more compatible than urea. Accordingly, the UCS adduct granules can be used to provide a range of nitrogen-phosphorus-sulfur (NPS), nitrogen-sulfur (NS), nitrogen-potassium-sulfur (NKS), and nitrogen-phosphorous-potassium (NPK) grades. Non-limiting examples of formulations for multiple grades and the nutrient concentration and nutrient ratios in each are shown in Tables 3-11 below (shown in wt. % of the final blend unless otherwise indicated).

TABLE 3

(UCS adduct granule + DAP blend)

| Blend or Compounding (%) | | Nutrient Concentrations (%) | | | Nutrient Ratios | |
|---|---|---|---|---|---|---|
| UCS | DAP | N | $P_2O_5$ | S | N:P | N:S |
| 0 | 100 | 18 | 46 | 0 | 0.39 | |
| 5 | 95 | 18.75 | 43.7 | 0.25 | 0.43 | 75.00 |
| 10 | 90 | 19.5 | 41.4 | 0.5 | 0.47 | 39.00 |
| 15 | 85 | 20.25 | 39.1 | 0.75 | 0.52 | 27.00 |
| 20 | 80 | 21 | 36.8 | 1 | 0.57 | 21.00 |
| 25 | 75 | 21.75 | 34.5 | 1.25 | 0.63 | 17.40 |
| 30 | 70 | 22.5 | 32.2 | 1.5 | 0.70 | 15.00 |
| 35 | 65 | 23.25 | 29.9 | 1.75 | 0.78 | 13.29 |
| 40 | 60 | 24 | 27.6 | 2 | 0.87 | 12.00 |
| 45 | 55 | 24.75 | 25.3 | 2.25 | 0.98 | 11.00 |
| 50 | 50 | 25.5 | 23 | 2.5 | 1.11 | 10.20 |
| 55 | 45 | 26.25 | 20.7 | 2.75 | 1.27 | 9.55 |
| 60 | 40 | 27 | 18.4 | 3 | 1.47 | 9.00 |
| 65 | 35 | 27.75 | 16.1 | 3.25 | 1.72 | 8.54 |
| 70 | 30 | 28.5 | 13.8 | 3.5 | 2.07 | 8.14 |
| 75 | 25 | 29.25 | 11.5 | 3.75 | 2.54 | 7.80 |
| 80 | 20 | 30 | 9.2 | 4 | 3.26 | 7.50 |
| 85 | 15 | 30.75 | 6.9 | 4.25 | 4.46 | 7.24 |
| 90 | 10 | 31.5 | 4.6 | 4.5 | 6.85 | 7.00 |
| 95 | 5 | 32.25 | 2.3 | 4.75 | 14.02 | 6.79 |
| 100 | 0 | 33 | 0 | 5 | | 6.60 |

TABLE 4

(UCS adduct granule + MAP blend)

| Blend or Compounding (%) | | Nutrient Concentrations (%) | | | Nutrient Ratios | |
|---|---|---|---|---|---|---|
| UCS | MAP | N | $P_2O_5$ | S | N:P | N:S |
| 0 | 100 | 11 | 52 | 0 | 0.21 | |
| 5 | 95 | 12.1 | 49.4 | 0.25 | 0.24 | 48.40 |
| 10 | 90 | 13.2 | 46.8 | 0.5 | 0.28 | 26.40 |
| 15 | 85 | 14.3 | 44.2 | 0.75 | 0.32 | 19.07 |
| 20 | 80 | 15.4 | 41.6 | 1 | 0.37 | 15.40 |
| 25 | 75 | 16.5 | 39 | 1.25 | 0.42 | 13.20 |
| 30 | 70 | 17.6 | 36.4 | 1.5 | 0.48 | 11.73 |
| 35 | 65 | 18.7 | 33.8 | 1.75 | 0.55 | 10.69 |
| 40 | 60 | 19.8 | 31.2 | 2 | 0.63 | 9.90 |
| 45 | 55 | 20.9 | 28.6 | 2.25 | 0.73 | 9.29 |
| 50 | 50 | 22 | 26 | 2.5 | 0.85 | 8.80 |
| 55 | 45 | 23.1 | 23.4 | 2.75 | 0.99 | 8.40 |
| 60 | 40 | 24.2 | 20.8 | 3 | 1.16 | 8.07 |
| 65 | 35 | 25.3 | 18.2 | 3.25 | 1.39 | 7.78 |
| 70 | 30 | 26.4 | 15.6 | 3.5 | 1.69 | 7.54 |
| 75 | 25 | 27.5 | 13 | 3.75 | 2.12 | 7.33 |
| 80 | 20 | 28.6 | 10.4 | 4 | 2.75 | 7.15 |
| 85 | 15 | 29.7 | 7.8 | 4.25 | 3.81 | 6.99 |
| 90 | 10 | 30.8 | 5.2 | 4.5 | 5.92 | 6.84 |
| 95 | 5 | 31.9 | 2.6 | 4.75 | 12.27 | 6.72 |
| 100 | 0 | 33 | 0 | 5 | | 6.60 |

TABLE 5

(UCS adduct granule + urea blend)

| Blend or Compounding (%) | | Nutrient Concentrations (%) | | Nutrient Ratios |
|---|---|---|---|---|
| UCS | Urea | N | S | N:S |
| 0 | 100 | 46 | 0 | |
| 5 | 95 | 45.35 | 0.25 | 181.40 |
| 10 | 90 | 44.7 | 0.5 | 89.40 |
| 15 | 85 | 44.05 | 0.75 | 58.73 |
| 20 | 80 | 43.4 | 1 | 43.40 |
| 25 | 75 | 42.75 | 1.25 | 34.20 |
| 30 | 70 | 42.1 | 1.5 | 28.07 |
| 35 | 65 | 41.45 | 1.75 | 23.69 |
| 40 | 60 | 40.8 | 2 | 20.40 |
| 45 | 55 | 40.15 | 2.25 | 17.84 |
| 50 | 50 | 39.5 | 2.5 | 15.80 |
| 55 | 45 | 38.85 | 2.75 | 14.13 |
| 60 | 40 | 38.2 | 3 | 12.73 |
| 65 | 35 | 37.55 | 3.25 | 11.55 |
| 70 | 30 | 36.9 | 3.5 | 10.54 |
| 75 | 25 | 36.25 | 3.75 | 9.67 |
| 80 | 20 | 35.6 | 4 | 8.90 |
| 85 | 15 | 34.95 | 4.25 | 8.22 |
| 90 | 10 | 34.3 | 4.5 | 7.62 |
| 95 | 5 | 33.65 | 4.75 | 7.08 |
| 100 | 0 | 33 | 5 | 6.60 |

TABLE 6

(UCS adduct granule + potash blend (SOP))

| Blend or Compounding (%) | | Nutrient Concentrations (%) | | | | Nutrient Ratios |
|---|---|---|---|---|---|---|
| UCS | SOP | N | K$_2$O | S | Ca | N:K$_2$O |
| 60 | 40 | 19.8 | 20 | 10.2 | 3 | 1.0 |
| 65 | 35 | 21.45 | 17.5 | 9.55 | 3.25 | 1.2 |
| 70 | 30 | 23.1 | 15 | 8.9 | 3.5 | 1.5 |
| 75 | 25 | 24.75 | 12.5 | 8.25 | 3.75 | 2.0 |
| 80 | 20 | 26.4 | 10 | 7.6 | 4 | 2.6 |
| 85 | 15 | 28.05 | 7.5 | 6.95 | 4.25 | 3.7 |
| 90 | 10 | 29.7 | 5 | 6.3 | 4.5 | 5.9 |
| 95 | 5 | 31.35 | 2.5 | 5.65 | 4.75 | 12.5 |
| 100 | 0 | 33 | 0 | 5 | 5 | |

TABLE 7

(UCS adduct granule + MOP blend)

| Blend or Compounding (%) | | Nutrient Concentrations (%) | | | | Nutrient Ratios |
|---|---|---|---|---|---|---|
| UCS | MOP | N | K$_2$O | S | Ca | N:K$_2$O |
| 50 | 50 | 16.5 | 30 | 2.5 | 2.5 | 0.6 |
| 55 | 45 | 18.15 | 27 | 2.75 | 2.75 | 0.7 |
| 60 | 40 | 19.8 | 24 | 10.2 | 3 | 0.8 |
| 65 | 35 | 21.45 | 21 | 9.55 | 3.25 | 1.0 |
| 70 | 30 | 23.1 | 18 | 8.9 | 3.5 | 1.3 |
| 75 | 25 | 24.75 | 15 | 8.25 | 3.75 | 1.7 |
| 80 | 20 | 26.4 | 12 | 7.6 | 4 | 2.2 |
| 85 | 15 | 28.05 | 9 | 6.95 | 4.25 | 3.1 |
| 90 | 10 | 29.7 | 6 | 6.3 | 4.5 | 5.0 |
| 95 | 5 | 31.35 | 3 | 5.65 | 4.75 | 10.5 |
| 100 | 0 | 33 | 0 | 5 | 5 | |

TABLE 8

(UCS adduct granule + DAP + MOP blend)

| Blend or Compounding (kg/metric ton) | | | Nutrient Concentrations (%) | | | | Nutrient Ratios |
|---|---|---|---|---|---|---|---|
| UCS | MOP | DAP | N | P$_2$O$_5$ | K$_2$O | S | N:P$_2$O$_5$ |
| 437 | 50 | 513 | 23.7 | 23.6 | 3 | 2.2 | 1.0 |
| 425.5 | 75 | 499.5 | 23.0 | 23.0 | 4.5 | 2.1 | 1.0 |
| 414 | 100 | 486 | 22.4 | 22.4 | 6 | 2.1 | 1.0 |
| 404.8 | 120 | 475.2 | 21.9 | 21.9 | 7.2 | 2.0 | 1.0 |
| 395.6 | 140 | 464.4 | 21.4 | 21.4 | 8.4 | 2.0 | 1.0 |
| 386.4 | 160 | 453.6 | 20.9 | 20.9 | 9.6 | 1.9 | 1.0 |
| 377.2 | 180 | 442.8 | 20.4 | 20.4 | 10.8 | 1.9 | 1.0 |
| 368 | 200 | 432 | 19.9 | 19.9 | 12 | 1.8 | 1.0 |
| 358.8 | 220 | 421.2 | 19.4 | 19.4 | 13.2 | 1.8 | 1.0 |
| 349.6 | 240 | 410.4 | 18.9 | 18.9 | 14.4 | 1.7 | 1.0 |
| 340.4 | 260 | 399.6 | 18.4 | 18.4 | 15.6 | 1.7 | 1.0 |
| 331.2 | 280 | 388.8 | 17.9 | 17.9 | 16.8 | 1.7 | 1.0 |
| 322 | 300 | 378 | 17.4 | 17.4 | 18 | 1.6 | 1.0 |
| 312.8 | 320 | 367.2 | 16.9 | 16.9 | 19.2 | 1.6 | 1.0 |
| 303.6 | 340 | 356.4 | 16.4 | 16.4 | 20.4 | 1.5 | 1.0 |
| 294.4 | 360 | 345.6 | 15.9 | 15.9 | 21.6 | 1.5 | 1.0 |
| 285.2 | 380 | 334.8 | 15.4 | 15.4 | 22.8 | 1.4 | 1.0 |
| 276 | 400 | 324 | 14.9 | 14.9 | 24 | 1.4 | 1.0 |
| 540 | 100 | 360 | 24.3 | 16.6 | 6 | 2.7 | 1.5 |
| 528 | 120 | 352 | 23.8 | 16.2 | 7.2 | 2.64 | 1.5 |
| 516 | 140 | 344 | 23.2 | 15.8 | 8.4 | 2.58 | 1.5 |
| 504 | 160 | 336 | 22.7 | 15.5 | 9.6 | 2.52 | 1.5 |
| 492 | 180 | 328 | 22.1 | 15.1 | 10.8 | 2.46 | 1.5 |
| 480 | 200 | 320 | 21.6 | 14.7 | 12 | 2.4 | 1.5 |
| 468 | 220 | 312 | 21.1 | 14.4 | 13.2 | 2.34 | 1.5 |
| 456 | 240 | 304 | 20.5 | 14.0 | 14.4 | 2.28 | 1.5 |
| 444 | 260 | 296 | 20.0 | 13.6 | 15.6 | 2.22 | 1.5 |
| 432 | 280 | 288 | 19.4 | 13.2 | 16.8 | 2.16 | 1.5 |
| 420 | 300 | 280 | 18.9 | 12.9 | 18 | 2.1 | 1.5 |
| 621 | 100 | 279 | 25.5 | 12.8 | 6 | 3.105 | 2.0 |
| 607.2 | 120 | 272.8 | 24.9 | 12.5 | 7.2 | 3.036 | 2.0 |
| 593.4 | 140 | 266.6 | 24.4 | 12.3 | 8.4 | 2.967 | 2.0 |
| 579.6 | 160 | 260.4 | 23.8 | 12.0 | 9.6 | 2.898 | 2.0 |
| 565.8 | 180 | 254.2 | 23.2 | 11.7 | 10.8 | 2.829 | 2.0 |
| 552 | 200 | 248 | 22.7 | 11.4 | 12 | 2.76 | 2.0 |
| 538.2 | 220 | 241.8 | 22.1 | 11.1 | 13.2 | 2.691 | 2.0 |
| 524.4 | 240 | 235.6 | 21.5 | 10.8 | 14.4 | 2.622 | 2.0 |
| 510.6 | 260 | 229.4 | 21.0 | 10.6 | 15.6 | 2.553 | 2.0 |
| 496.8 | 280 | 223.2 | 20.4 | 10.3 | 16.8 | 2.484 | 2.0 |
| 483 | 300 | 217 | 19.8 | 10.0 | 18 | 2.415 | 2.0 |
| 117 | 100 | 783 | 18.0 | 36.0 | 6 | 0.585 | 0.5 |
| 114.4 | 120 | 765.6 | 17.6 | 35.2 | 7.2 | 0.572 | 0.5 |
| 111.8 | 140 | 748.2 | 17.2 | 34.4 | 8.4 | 0.559 | 0.5 |
| 109.2 | 160 | 730.8 | 16.8 | 33.6 | 9.6 | 0.546 | 0.5 |
| 106.6 | 180 | 713.4 | 16.4 | 32.8 | 10.8 | 0.533 | 0.5 |
| 104 | 200 | 696 | 16.0 | 32.0 | 12 | 0.52 | 0.5 |
| 101.4 | 220 | 678.6 | 15.6 | 31.2 | 13.2 | 0.507 | 0.5 |
| 98.8 | 240 | 661.2 | 15.2 | 30.4 | 14.4 | 0.494 | 0.5 |
| 96.2 | 260 | 643.8 | 14.8 | 29.6 | 15.6 | 0.481 | 0.5 |
| 93.6 | 280 | 626.4 | 14.4 | 28.8 | 16.8 | 0.468 | 0.5 |
| 91 | 300 | 609 | 14.0 | 28.0 | 18 | 0.455 | 0.5 |
| 88.4 | 320 | 591.6 | 13.6 | 27.2 | 19.2 | 0.442 | 0.5 |
| 85.8 | 340 | 574.2 | 13.2 | 26.4 | 20.4 | 0.429 | 0.5 |
| 83.2 | 360 | 556.8 | 12.8 | 25.6 | 21.6 | 0.416 | 0.5 |
| 80.6 | 380 | 539.4 | 12.4 | 24.8 | 22.8 | 0.403 | 0.5 |
| 78 | 400 | 522 | 12.0 | 24.0 | 24 | 0.39 | 0.5 |

TABLE 9

(UCS adduct granule + DAP + SOP blend)

| Blend or Compounding (kg/metric ton) | | | Nutrient Concentrations (%) | | | | Nutrient Ratios |
|---|---|---|---|---|---|---|---|
| UCS | SOP | DAP | N | P$_2$O$_5$ | K$_2$O | S | N:P$_2$O$_5$ |
| 437 | 50 | 513 | 23.7 | 23.6 | 2.5 | 3.085 | 1.0 |
| 425.5 | 75 | 499.5 | 23.0 | 23.0 | 3.75 | 3.4775 | 1.0 |

TABLE 9-continued (UCS adduct granule + DAP + SOP blend)

| Blend or Compounding (kg/metric ton) | | | Nutrient Concentrations (%) | | | | Nutrient Ratios |
|---|---|---|---|---|---|---|---|
| UCS | SOP | DAP | N | P$_2$O$_5$ | K$_2$O | S | N:P$_2$O$_5$ |
| 414 | 100 | 486 | 22.4 | 22.4 | 5 | 3.87 | 1.0 |
| 404.8 | 120 | 475.2 | 21.9 | 21.9 | 6 | 4.184 | 1.0 |
| 395.6 | 140 | 464.4 | 21.4 | 21.4 | 7 | 4.498 | 1.0 |
| 386.4 | 160 | 453.6 | 20.9 | 20.9 | 8 | 4.812 | 1.0 |
| 377.2 | 180 | 442.8 | 20.4 | 20.4 | 9 | 5.126 | 1.0 |
| 368 | 200 | 432 | 19.9 | 19.9 | 10 | 5.44 | 1.0 |
| 358.8 | 220 | 421.2 | 19.4 | 19.4 | 11 | 5.754 | 1.0 |
| 349.6 | 240 | 410.4 | 18.9 | 18.9 | 12 | 6.068 | 1.0 |
| 340.4 | 260 | 399.6 | 18.4 | 18.4 | 13 | 6.382 | 1.0 |
| 331.2 | 280 | 388.8 | 17.9 | 17.9 | 14 | 6.696 | 1.0 |
| 322 | 300 | 378 | 17.4 | 17.4 | 15 | 7.01 | 1.0 |
| 540 | 100 | 360 | 24.3 | 16.6 | 5 | 4.5 | 1.5 |
| 528 | 120 | 352 | 23.8 | 16.2 | 6 | 4.8 | 1.5 |
| 516 | 140 | 344 | 23.2 | 15.8 | 7 | 5.1 | 1.5 |
| 504 | 160 | 336 | 22.7 | 15.5 | 8 | 5.4 | 1.5 |
| 492 | 180 | 328 | 22.1 | 15.1 | 9 | 5.7 | 1.5 |
| 480 | 200 | 320 | 21.6 | 14.7 | 10 | 6 | 1.5 |
| 468 | 220 | 312 | 21.1 | 14.4 | 11 | 6.3 | 1.5 |
| 456 | 240 | 304 | 20.5 | 14.0 | 12 | 6.6 | 1.5 |
| 444 | 260 | 296 | 20.0 | 13.6 | 13 | 6.9 | 1.5 |
| 432 | 280 | 288 | 19.4 | 13.2 | 14 | 7.2 | 1.5 |
| 420 | 300 | 280 | 18.9 | 12.9 | 15 | 7.5 | 1.5 |
| 621 | 100 | 279 | 25.5 | 12.8 | 5 | 4.905 | 2.0 |
| 607.2 | 120 | 272.8 | 24.9 | 12.5 | 6 | 5.196 | 2.0 |
| 593.4 | 140 | 266.6 | 24.4 | 12.3 | 7 | 5.487 | 2.0 |
| 579.6 | 160 | 260.4 | 23.8 | 12.0 | 8 | 5.778 | 2.0 |
| 565.8 | 180 | 254.2 | 23.2 | 11.7 | 9 | 6.069 | 2.0 |
| 552 | 200 | 248 | 22.7 | 11.4 | 10 | 6.36 | 2.0 |
| 538.2 | 220 | 241.8 | 22.1 | 11.1 | 11 | 6.651 | 2.0 |
| 524.4 | 240 | 235.6 | 21.5 | 10.8 | 12 | 6.942 | 2.0 |
| 510.6 | 260 | 229.4 | 21.0 | 10.6 | 13 | 7.233 | 2.0 |
| 496.8 | 280 | 223.2 | 20.4 | 10.3 | 14 | 7.524 | 2.0 |
| 483 | 300 | 217 | 19.8 | 10.0 | 15 | 7.815 | 2.0 |
| 117 | 100 | 783 | 18.0 | 36.0 | 5 | 2.385 | 0.5 |
| 114.4 | 120 | 765.6 | 17.6 | 35.2 | 6 | 2.732 | 0.5 |
| 111.8 | 140 | 748.2 | 17.2 | 34.4 | 7 | 3.079 | 0.5 |
| 109.2 | 160 | 730.8 | 16.8 | 33.6 | 8 | 3.426 | 0.5 |
| 106.6 | 180 | 713.4 | 16.4 | 32.8 | 9 | 3.773 | 0.5 |
| 104 | 200 | 696 | 16.0 | 32.0 | 10 | 4.12 | 0.5 |
| 101.4 | 220 | 678.6 | 15.6 | 31.2 | 11 | 4.467 | 0.5 |
| 98.8 | 240 | 661.2 | 15.2 | 30.4 | 12 | 4.814 | 0.5 |
| 96.2 | 260 | 643.8 | 14.8 | 29.6 | 13 | 5.161 | 0.5 |
| 93.6 | 280 | 626.4 | 14.4 | 28.8 | 14 | 5.508 | 0.5 |
| 91 | 300 | 609 | 14.0 | 28.0 | 15 | 5.855 | 0.5 |
| 88.4 | 320 | 591.6 | 13.6 | 27.2 | 16 | 6.202 | 0.5 |
| 85.8 | 340 | 574.2 | 13.2 | 26.4 | 17 | 6.549 | 0.5 |
| 83.2 | 360 | 556.8 | 12.8 | 25.6 | 18 | 6.896 | 0.5 |
| 80.6 | 380 | 539.4 | 12.4 | 24.8 | 19 | 7.243 | 0.5 |
| 78 | 400 | 522 | 12.0 | 24.0 | 20 | 7.59 | 0.5 |
| 75.4 | 420 | 504.6 | 11.6 | 23.2 | 21 | 7.937 | 0.5 |
| 72.8 | 440 | 487.2 | 11.2 | 22.4 | 22 | 8.284 | 0.5 |
| 70.2 | 460 | 469.8 | 10.8 | 21.6 | 23 | 8.631 | 0.5 |
| 67.6 | 480 | 452.4 | 10.4 | 20.8 | 24 | 8.978 | 0.5 |
| 65 | 500 | 435 | 10.0 | 20.0 | 25 | 9.325 | 0.5 |
| 62.4 | 520 | 417.6 | 9.6 | 19.2 | 26 | 9.672 | 0.5 |
| 59.8 | 540 | 400.2 | 9.2 | 18.4 | 27 | 10.019 | 0.5 |
| 57.2 | 560 | 382.8 | 8.8 | 17.6 | 28 | 10.366 | 0.5 |
| 54.6 | 580 | 365.4 | 8.4 | 16.8 | 29 | 10.713 | 0.5 |
| 52 | 600 | 348 | 8.0 | 16.0 | 30 | 11.06 | 0.5 |

TABLE 10

(UCS adduct granule + MAP + MOP blend)

| Blend or Compounding (kg/metric ton) | | | Nutrient Concentrations (%) | | | | Nutrient Ratios |
|---|---|---|---|---|---|---|---|
| UCS | MOP | MAP | N | P$_2$O$_5$ | K$_2$O | S | N:P$_2$O$_5$ |
| 522.5 | 50 | 427.5 | 21.9 | 22.2 | 3 | 2.6125 | 1.0 |
| 508.75 | 75 | 416.25 | 21.4 | 21.6 | 4.5 | 2.54375 | 1.0 |
| 495 | 100 | 405 | 20.8 | 21.1 | 6 | 2.475 | 1.0 |
| 484 | 120 | 396 | 20.3 | 20.6 | 7.2 | 2.42 | 1.0 |
| 473 | 140 | 387 | 19.9 | 20.1 | 8.4 | 2.365 | 1.0 |
| 462 | 160 | 378 | 19.4 | 19.7 | 9.6 | 2.31 | 1.0 |
| 451 | 180 | 369 | 18.9 | 19.2 | 10.8 | 2.255 | 1.0 |
| 440 | 200 | 360 | 18.5 | 18.7 | 12 | 2.2 | 1.0 |
| 429 | 220 | 351 | 18.0 | 18.3 | 13.2 | 2.145 | 1.0 |
| 418 | 240 | 342 | 17.6 | 17.8 | 14.4 | 2.09 | 1.0 |
| 407 | 260 | 333 | 17.1 | 17.3 | 15.6 | 2.035 | 1.0 |
| 396 | 280 | 324 | 16.6 | 16.8 | 16.8 | 1.98 | 1.0 |
| 385 | 300 | 315 | 16.2 | 16.4 | 18 | 1.925 | 1.0 |
| 374 | 320 | 306 | 15.7 | 15.9 | 19.2 | 1.87 | 1.0 |
| 363 | 340 | 297 | 15.2 | 15.4 | 20.4 | 1.815 | 1.0 |
| 352 | 360 | 288 | 14.8 | 15.0 | 21.6 | 1.76 | 1.0 |
| 341 | 380 | 279 | 14.3 | 14.5 | 22.8 | 1.705 | 1.0 |
| 330 | 400 | 270 | 13.9 | 14.0 | 24 | 1.65 | 1.0 |
| 594 | 100 | 306 | 23.0 | 15.9 | 6 | 2.97 | 1.4 |
| 580.8 | 120 | 299.2 | 22.5 | 15.6 | 7.2 | 2.904 | 1.4 |
| 567.6 | 140 | 292.4 | 21.9 | 15.2 | 8.4 | 2.838 | 1.4 |
| 554.4 | 160 | 285.6 | 21.4 | 14.9 | 9.6 | 2.772 | 1.4 |
| 541.2 | 180 | 278.8 | 20.9 | 14.5 | 10.8 | 2.706 | 1.4 |
| 528 | 200 | 272 | 20.4 | 14.1 | 12 | 2.64 | 1.4 |
| 514.8 | 220 | 265.2 | 19.9 | 13.8 | 13.2 | 2.574 | 1.4 |
| 501.6 | 240 | 258.4 | 19.4 | 13.4 | 14.4 | 2.508 | 1.4 |
| 488.4 | 260 | 251.6 | 18.9 | 13.1 | 15.6 | 2.442 | 1.4 |
| 475.2 | 280 | 244.8 | 18.4 | 12.7 | 16.8 | 2.376 | 1.4 |
| 462 | 300 | 238 | 17.9 | 12.4 | 18 | 2.31 | 1.4 |
| 666 | 100 | 234 | 24.6 | 12.2 | 6 | 3.33 | 2.0 |
| 651.2 | 120 | 228.8 | 24.0 | 11.9 | 7.2 | 3.256 | 2.0 |
| 636.4 | 140 | 223.6 | 23.5 | 11.6 | 8.4 | 3.182 | 2.0 |
| 621.6 | 160 | 218.4 | 22.9 | 11.4 | 9.6 | 3.108 | 2.0 |
| 606.8 | 180 | 213.2 | 22.4 | 11.1 | 10.8 | 3.034 | 2.0 |
| 592 | 200 | 208 | 21.8 | 10.8 | 12 | 2.96 | 2.0 |
| 577.2 | 220 | 202.8 | 21.3 | 10.5 | 13.2 | 2.886 | 2.0 |
| 562.4 | 240 | 197.6 | 20.7 | 10.3 | 14.4 | 2.812 | 2.0 |
| 547.6 | 260 | 192.4 | 20.2 | 10.0 | 15.6 | 2.738 | 2.0 |
| 532.8 | 280 | 187.2 | 19.6 | 9.7 | 16.8 | 2.664 | 2.0 |
| 518 | 300 | 182 | 19.1 | 9.5 | 18 | 2.59 | 2.0 |
| 279 | 100 | 621 | 16.0 | 32.3 | 6 | 1.395 | 0.5 |
| 272.8 | 120 | 607.2 | 15.7 | 31.6 | 7.2 | 1.364 | 0.5 |
| 266.6 | 140 | 593.4 | 15.3 | 30.9 | 8.4 | 1.333 | 0.5 |
| 260.4 | 160 | 579.6 | 15.0 | 30.1 | 9.6 | 1.302 | 0.5 |
| 254.2 | 180 | 565.8 | 14.6 | 29.4 | 10.8 | 1.271 | 0.5 |
| 248 | 200 | 552 | 14.3 | 28.7 | 12 | 1.24 | 0.5 |
| 241.8 | 220 | 538.2 | 13.9 | 28.0 | 13.2 | 1.209 | 0.5 |
| 235.6 | 240 | 524.4 | 13.5 | 27.3 | 14.4 | 1.178 | 0.5 |
| 229.4 | 260 | 510.6 | 13.2 | 26.6 | 15.6 | 1.147 | 0.5 |
| 223.2 | 280 | 496.8 | 12.8 | 25.8 | 16.8 | 1.116 | 0.5 |
| 217 | 300 | 483 | 12.5 | 25.1 | 18 | 1.085 | 0.5 |
| 210.8 | 320 | 469.2 | 12.1 | 24.4 | 19.2 | 1.054 | 0.5 |
| 204.6 | 340 | 455.4 | 11.8 | 23.7 | 20.4 | 1.023 | 0.5 |
| 198.4 | 360 | 441.6 | 11.4 | 23.0 | 21.6 | 0.992 | 0.5 |
| 192.2 | 380 | 427.8 | 11.0 | 22.2 | 22.8 | 0.961 | 0.5 |
| 186 | 400 | 414 | 10.7 | 21.5 | 24 | 0.93 | 0.5 |

TABLE 11

(UCS adduct granule + MAP + SOP blend)

| Blend or Compounding (kg/metric ton) | | | Nutrient Concentrations (%) | | | | Nutrient Ratios |
|---|---|---|---|---|---|---|---|
| UCS | SOP | MAP | N | P$_2$O$_5$ | K$_2$O | S | N:P$_2$O$_5$ |
| 495 | 100 | 405 | 20.8 | 21.1 | 5 | 4.275 | 1.0 |
| 484 | 120 | 396 | 20.3 | 20.6 | 6 | 4.58 | 1.0 |

TABLE 11-continued (UCS adduct granule + MAP + SOP blend)

| Blend or Compounding (kg/metric ton) | | | Nutrient Concentrations (%) | | | | Nutrient Ratios |
| --- | --- | --- | --- | --- | --- | --- | --- |
| UCS | SOP | MAP | N | $P_2O_5$ | $K_2O$ | S | $N:P_2O_5$ |
| 473 | 140 | 387 | 19.9 | 20.1 | 7 | 4.885 | 1.0 |
| 462 | 160 | 378 | 19.4 | 19.7 | 8 | 5.19 | 1.0 |
| 451 | 180 | 369 | 18.9 | 19.2 | 9 | 5.495 | 1.0 |
| 440 | 200 | 360 | 18.5 | 18.7 | 10 | 5.8 | 1.0 |
| 429 | 220 | 351 | 18.0 | 18.3 | 11 | 6.105 | 1.0 |
| 418 | 240 | 342 | 17.6 | 17.8 | 12 | 6.41 | 1.0 |
| 407 | 260 | 333 | 17.1 | 17.3 | 13 | 6.715 | 1.0 |
| 396 | 280 | 324 | 16.6 | 16.8 | 14 | 7.02 | 1.0 |
| 385 | 300 | 315 | 16.2 | 16.4 | 15 | 7.325 | 1.0 |
| 374 | 320 | 306 | 15.7 | 15.9 | 16 | 7.63 | 1.0 |
| 363 | 340 | 297 | 15.2 | 15.4 | 17 | 7.935 | 1.0 |
| 352 | 360 | 288 | 14.8 | 15.0 | 18 | 8.24 | 1.0 |
| 341 | 380 | 279 | 14.3 | 14.5 | 19 | 8.545 | 1.0 |
| 330 | 400 | 270 | 13.9 | 14.0 | 20 | 8.85 | 1.0 |
| 594 | 100 | 306 | 23.0 | 15.9 | 5 | 4.77 | 1.4 |
| 580.8 | 120 | 299.2 | 22.5 | 15.6 | 6 | 5.064 | 1.4 |
| 567.6 | 140 | 292.4 | 21.9 | 15.2 | 7 | 5.358 | 1.4 |
| 554.4 | 160 | 285.6 | 21.4 | 14.9 | 8 | 5.652 | 1.4 |
| 541.2 | 180 | 278.8 | 20.9 | 14.5 | 9 | 5.946 | 1.4 |
| 528 | 200 | 272 | 20.4 | 14.1 | 10 | 6.24 | 1.4 |
| 514.8 | 220 | 265.2 | 19.9 | 13.8 | 11 | 6.534 | 1.4 |
| 501.6 | 240 | 258.4 | 19.4 | 13.4 | 12 | 6.828 | 1.4 |
| 488.4 | 260 | 251.6 | 18.9 | 13.1 | 13 | 7.122 | 1.4 |
| 475.2 | 280 | 244.8 | 18.4 | 12.7 | 14 | 7.416 | 1.4 |
| 462 | 300 | 238 | 17.9 | 12.4 | 15 | 7.71 | 1.4 |
| 666 | 100 | 234 | 24.6 | 12.2 | 5 | 5.13 | 2.0 |
| 651.2 | 120 | 228.8 | 24.0 | 11.9 | 6 | 5.416 | 2.0 |
| 636.4 | 140 | 223.6 | 23.5 | 11.6 | 7 | 5.702 | 2.0 |
| 621.6 | 160 | 218.4 | 22.9 | 11.4 | 8 | 5.988 | 2.0 |
| 606.8 | 180 | 213.2 | 22.4 | 11.1 | 9 | 6.274 | 2.0 |
| 592 | 200 | 208 | 21.8 | 10.8 | 10 | 6.56 | 2.0 |
| 577.2 | 220 | 202.8 | 21.3 | 10.5 | 11 | 6.846 | 2.0 |
| 562.4 | 240 | 197.6 | 20.7 | 10.3 | 12 | 7.132 | 2.0 |
| 547.6 | 260 | 192.4 | 20.2 | 10.0 | 13 | 7.418 | 2.0 |
| 532.8 | 280 | 187.2 | 19.6 | 9.7 | 14 | 7.704 | 2.0 |
| 518 | 300 | 182 | 19.1 | 9.5 | 15 | 7.99 | 2.0 |
| 503.2 | 320 | 176.8 | 18.6 | 9.2 | 16 | 8.276 | 2.0 |
| 488.4 | 340 | 171.6 | 18.0 | 8.9 | 17 | 8.562 | 2.0 |
| 473.6 | 360 | 166.4 | 17.5 | 8.7 | 18 | 8.848 | 2.0 |
| 279 | 100 | 621 | 16.0 | 32.3 | 5 | 3.195 | 0.5 |
| 272.8 | 120 | 607.2 | 15.7 | 31.6 | 6 | 3.524 | 0.5 |
| 266.6 | 140 | 593.4 | 15.3 | 30.9 | 7 | 3.853 | 0.5 |
| 260.4 | 160 | 579.6 | 15.0 | 30.1 | 8 | 4.182 | 0.5 |
| 254.2 | 180 | 565.8 | 14.6 | 29.4 | 9 | 4.511 | 0.5 |
| 248 | 200 | 552 | 14.3 | 28.7 | 10 | 4.84 | 0.5 |
| 241.8 | 220 | 538.2 | 13.9 | 28.0 | 11 | 5.169 | 0.5 |
| 235.6 | 240 | 524.4 | 13.5 | 27.3 | 12 | 5.498 | 0.5 |
| 229.4 | 260 | 510.6 | 13.2 | 26.6 | 13 | 5.827 | 0.5 |
| 223.2 | 280 | 496.8 | 12.8 | 25.8 | 14 | 6.156 | 0.5 |
| 217 | 300 | 483 | 12.5 | 25.1 | 15 | 6.485 | 0.5 |
| 210.8 | 320 | 469.2 | 12.1 | 24.4 | 16 | 6.814 | 0.5 |
| 204.6 | 340 | 455.4 | 11.8 | 23.7 | 17 | 7.143 | 0.5 |
| 198.4 | 360 | 441.6 | 11.4 | 23.0 | 18 | 7.472 | 0.5 |
| 192.2 | 380 | 427.8 | 11.0 | 22.2 | 19 | 7.801 | 0.5 |
| 186 | 400 | 414 | 10.7 | 21.5 | 20 | 8.13 | 0.5 |

The invention claimed is:

1. A calcium sulfate urea (UCS) fertilizer granule comprising urea, calcium sulfate, and a calcium sulfate urea adduct, wherein the granule comprises 33 wt. % to 40 wt. % elemental nitrogen, 2 wt. % to 5 wt. % elemental calcium, 2 wt. % to 5 wt. % elemental sulfur, 0.1 wt. % to 50 wt. % ammonium sulfate, and less than 1 wt. % free moisture, wherein at least 30 wt. % of the urea in the granule is comprised in the calcium sulfate urea adduct.

2. The UCS fertilizer granule of claim 1, comprising 33 wt. % to 37 wt. % elemental nitrogen, 3 wt. % to 5 wt. % elemental calcium, and 3 wt. % to 5 wt. % elemental sulfur.

3. The UCS fertilizer granule of claim 2, comprising 33 wt. % to 35 wt. % elemental nitrogen, 4 wt. % to 5 wt. % elemental calcium, and 4 wt. % to 5 wt. % elemental sulfur.

4. The UCS fertilizer granule of claim 1, wherein at least 50 wt. % of the urea in the granule is comprised in the calcium sulfate urea adduct.

5. The UCS fertilizer granule of claim 1, comprising less than 0.8 wt. % free moisture.

6. The UCS fertilizer granule of claim 1, wherein the adduct is $CaSO_4 \cdot 4CO(NH_2)_2$.

7. The UCS fertilizer granule of claim 1, comprising calcium sulfate urea adduct particles, urea particles, and calcium sulfate particles.

8. The UCS fertilizer granule of claim 1, further comprising 1.5 wt. % to 4 wt. % MgO and wherein the granule has a hardness of 10 N/granule to 50 N/granule.

9. The UCS fertilizer granule of claim 1, further comprising one or both of sulfuric acid and ammonium and/or comprising 1 wt. % to 10 wt. % in situ created ammonium sulfate.

10. A fertilizer blend or compounded fertilizer comprising the UCS fertilizer granule of claim 1, and at least one additional component.

11. The fertilizer blend or compounded fertilizer of claim 10, wherein the at least one additional component is a phosphate-based fertilizer, a urea-based fertilizer, or a potassium-based fertilizer.

12. The fertilizer blend or compounded fertilizer of claim 10, wherein the at least one additional component is a micronutrient, a secondary nutrient, an organic additive, or any combination thereof.

13. The fertilizer blend or compounded fertilizer of claim 10, wherein the at least one additional component is sulfate of potash (SOP), wherein the fertilizer blend or compounded fertilizer comprises 19 wt. % to 33 wt. % elemental nitrogen, 2 wt. % to 5 wt. % elemental calcium, 5 wt. % to 10 wt. % elemental sulfur, and 0.001 wt. % to 20 wt. % $K_2O$.

14. A method of making the calcium sulfate urea (UCS) fertilizer granule of claim 1, the method comprising:
    combining urea, calcium sulfate, and water to form an aqueous slurry, wherein urea is combined in excess of the stoichiometric ratio for production of a calcium sulfate urea adduct and the urea and calcium sulfate are combined in sufficient ratios to produce the aqueous slurry capable of producing a dried product containing 33 wt. % to 40 wt. % elemental nitrogen, 2 wt. % to 5 wt. % elemental calcium, 2 wt. % to 5 wt. % elemental sulfur;
    mixing the aqueous slurry under conditions sufficient to produce a calcium sulfate urea adduct wherein at least 30 wt. % of the urea in the granule is comprised in the calcium sulfate urea adduct; and
    removing at least a portion of the water from the aqueous slurry to form the calcium sulfate urea (UCS) fertilizer granule with less than 1 wt. % free moisture.

15. The method of claim 14, wherein removing at least a portion of the water from the aqueous slurry comprises adding sulfuric acid and ammonia to cause an exothermic reaction, wherein heat generated from the exothermic reaction is sufficient to remove at least a portion of the water from the aqueous slurry.

16. The method of claim 15, wherein the amount of sulfuric acid added is from about 5% to 15% of the weight of the aqueous slurry.

17. The method of claim 15, wherein from about 1.5 to 2.5 moles of ammonia are added for every one mole of sulfuric acid.

18. The method of claim 14, wherein the aqueous slurry comprises 12 wt. % to 16 wt. % water.

19. The method of claim 14, further comprising adding a sufficient amount of $MgSO_4$ to obtain a calcium sulfate urea (UCS) fertilizer granule further comprising 1.5 wt. % to 5 wt. % MgO.

20. A calcium sulfate urea (UCS) slurry comprising 12 to 16% water, urea, calcium sulfate, a calcium sulfate urea adduct, and ammonium sulfate in amounts such that when the slurry is dried, the dried slurry comprises 33 wt. % to 40 wt. % elemental nitrogen, 2 wt. % to 5 wt. % elemental calcium, and 2 wt. % to 5 wt. % elemental sulfur.

* * * * *